(12) United States Patent
Katae et al.

(10) Patent No.: US 7,204,338 B2
(45) Date of Patent: Apr. 17, 2007

(54) HANDLE KNOB FOR INDUSTRIAL VEHICLE

(75) Inventors: Kenichi Katae, Kariya (JP); Hisashi Ichijo, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 146 days.

(21) Appl. No.: 10/470,227

(22) PCT Filed: Feb. 18, 2002

(86) PCT No.: PCT/JP02/01352

§ 371 (c)(1),
(2), (4) Date: Jul. 25, 2003

(87) PCT Pub. No.: WO03/047914

PCT Pub. Date: Jun. 12, 2003

(65) Prior Publication Data

US 2004/0050612 A1 Mar. 18, 2004

(30) Foreign Application Priority Data

Dec. 5, 2001 (JP) ............................. 2001-371947

(51) Int. Cl.
*B62D 1/04* (2006.01)
*G05G 1/08* (2006.01)
(52) U.S. Cl. .................. 180/315; 74/557; 180/321
(58) Field of Classification Search ........ 180/321–324, 180/315; 187/222; 340/825.69, 835.72; 74/557

See application file for complete search history.

(56) References Cited

U.S. PATENT DOCUMENTS

| 3,163,253 | A | * | 12/1964 | Gibson et al. | ............... | 180/425 |
| 3,703,217 | A | * | 11/1972 | Kulick et al. | ............... | 180/272 |
| 3,822,771 | A | * | 7/1974 | Audiffred et al. | ........... | 477/168 |
| 4,374,310 | A | * | 2/1983 | Kato et al. | ................ | 200/61.54 |
| 4,628,310 | A | * | 12/1986 | Reighard et al. | ....... | 340/825.72 |
| 5,335,743 | A | * | 8/1994 | Gillbrand et al. | ........... | 180/178 |
| 5,586,620 | A | | 12/1996 | Dammeyer et al. | ......... | 187/227 |
| 5,738,187 | A | | 4/1998 | Dammeyer et al. | ......... | 187/222 |
| 5,905,237 | A | | 5/1999 | Hayakawa et al. | ....... | 200/61.28 |
| 6,078,252 | A | * | 6/2000 | Kulczycki et al. | ....... | 340/425.5 |
| 6,078,293 | A | * | 6/2000 | Yamamoto | ................... | 343/713 |
| 6,091,033 | A | | 7/2000 | Kato | ........................ | 200/61.54 |
| 6,226,570 | B1 | * | 5/2001 | Hahn | ........................... | 701/1 |
| 6,852,934 | B1 | * | 2/2005 | Lashua | ....................... | 200/5 R |

(Continued)

FOREIGN PATENT DOCUMENTS

DE 19951379 A1 * 5/2001

(Continued)

*Primary Examiner*—David R. Dunn
*Assistant Examiner*—Laura B. Rosenberg
(74) *Attorney, Agent, or Firm*—Morgan & Finnegan, L.L.P.

(57) ABSTRACT

A steering wheel mounted on a forklift 1 is provided with a steering wheel knob 17 which can be operated with one hand holding it. The steering wheel knob 17 has an approximately egg-like shape with switches 46, 47 provided on its end face. Incorporated in the steering wheel knob 17 are a transmission circuit 49, which radio-transmits a signal when the switches 46, 47 are operated, and a battery 51. The signal transmitted from the steering wheel knob 17 is received by a reception section 68 on a vehicle body 2 and a controller 48 executes predetermined control based on that signal.

32 Claims, 17 Drawing Sheets

U.S. PATENT DOCUMENTS

2002/0047255 A1 * 4/2002 Baume et al. .............. 280/775

FOREIGN PATENT DOCUMENTS

| | | |
|---|---|---|
| GB | 2 344 158 | 5/2000 |
| JP | 3-66282 | 6/1991 |
| JP | 04356272 A * | 12/1992 |
| JP | 5-86659 | 11/1993 |
| JP | 9-215116 | 8/1997 |
| JP | 10-269898 | 10/1998 |
| JP | 2000-67702 | 3/2000 |
| JP | 2000-72000 | 3/2000 |
| JP | 2001-039317 | 2/2001 |

* cited by examiner

Mark M1
Pattern P1   Pattern P1

Template

Mark M2
Pattern P2   Pattern P2

Template

Double Location Matching

Screen Coordinate System

Real Coordinate System

HANDLE KNOB FOR INDUSTRIAL VEHICLE

BACKGROUND OF THE INVENTION

The present invention relates to a wheel knob for an industrial vehicle and an industrial vehicle.

Conventionally, a steering wheel knob is formed on the steering wheel of a forklift, such as a reach type so that steering can be done with one hand. There may be a case where switches mounted on an instrument panel are operated while doing a steering operation depending on the circumstance. At this time, one needs to temporarily set the hand off the steering wheel knob in order to operate the switches on the instrument panel, thus raising a problem that the workability drops.

To solve the problem, the present applicant has proposed a steering wheel 200 as shown in FIG. 35 provided with a switch thereon in Japanese Unexamined Patent Publication No. Hei 9-215116. The steering wheel knob 200 is provided with a creep drive switch 201 and when the creep drive switch 201 is depressed, its detection signal is output to a control circuit 202. Then, when receiving the detection signal from the switch 201, the control circuit 202 controls a three-phase power converter 203 and drives a drive motor 204 to cause a vehicle to drive in creep mode.

Japanese Unexamined Patent Publication No. 2000-72000 discloses a steering wheel which can permit a switch operation while a steering wheel knob is being held. This steering wheel 206 is a steering wheel for handicapped persons and a grip holder 207 is attached to the steering wheel 206. Attached to the grip holder 207 are a grip (steering wheel knob) 208 and a switch case 212 which has three switches 209 to 211 for a horn, winker and light. The various switches 209 to 211 are operated by stretching a finger while holding the grip 208, which can ensure a steering operation and a switch operation simultaneously.

Although not described in Japanese Unexamined Patent Publication No. Hei 9-215116, it appears that the creep drive switch 201 is connected to the control circuit 202 by a wire. While the switch is provided on the steering wheel knob 200, therefore, the wires (harnesses) that connect the switch 201 to the control circuit 202 may suffer frictional wear or interfere when the steering wheel is operated, thereby raising a problem of disconnecting the line. In case where the steering wheel knob 200 is made movable relatively to a steering wheel 205, the problem becomes particularly noticeable.

Japanese Unexamined Patent Publication No. 2000-72000 describes that the switches 209 to 211 are connectable to the electric circuitry (not shown) for control wirelessly. While the switches 209 to 211 are radio-communicatable and the grip 208 and the switches 209 to 211 can be operated at the same time, however, fingers should be let go of the grip 208 at the time of the switch operation, the hold on the grip 208 would become loose, making the steering operation unstable.

SUMMARY OF THE INVENTION

The present invention has been devised in view of the above-described problems and aims at providing a steering wheel knob for an industrial vehicle and an industrial vehicle which eliminates the need for wiring in the steering wheel knob and can secure the gripped state of the steering wheel knob even in a case where a steering operation and another operation can be performed at the same time.

To solve the problems, according to the present invention, a wireless type communication section capable of executing at least one of transmission and reception by radio communication is built in a knob.

As the wireless type communication section capable of executing at least one of transmission and reception by radio communication is built in the knob according to the invention, one needs not to worry about disconnection or the like which may occur in case of wiring when the steering wheel is operated. Even in case where a steering operation and another operation via the communication section are to be executed at the same time, the gripped state of the steering wheel knob would not be deteriorated significantly.

DETAILED DESCRIPTION OF THE PREFERRED EMBODIMENTS

One embodiment of a steering wheel knob for an industrial vehicle and an industrial vehicle in which the present invention is embodied will be described below with reference to FIGS. 1 to 15.

Figure 5:
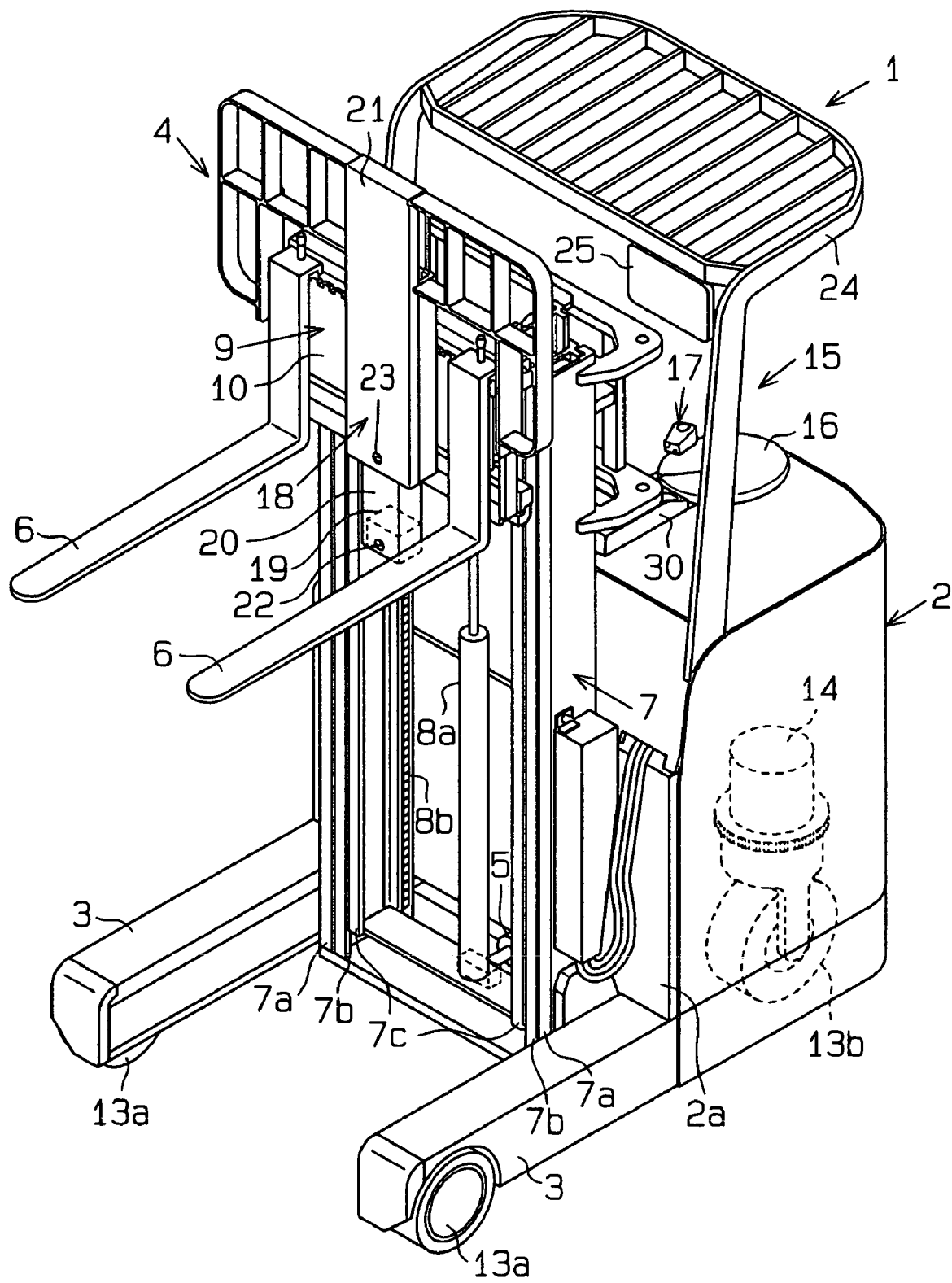
FIG. 5 is a perspective view of the forklift.

FIG. 5 is a perspective view of a forklift 1. The reach type forklift truck (hereinafter simply written as "forklift") 1 as an industrial vehicle (vehicle) has a pair of left and right reach legs 3 on the front side of a vehicle body (equipment platform) 2 and a mast assembly 4 is movable (reach operation) forward and rearward along the reach legs 3. A reach cylinder 5 is disposed on the vehicle body 2 and the reach cylinder 5 causes the mast assembly 4 to do the reach operation. The mast assembly 4 has forks 6 as a cargo carrying apparatus and the positions of the forks 6 are adjusted in the forward and reverse directions in accordance with the reach operation of the mast assembly 4.

A mast 7 of the mast assembly 4 is a three-level mast comprising an outer mast 7a, a middle mast 7b and an inner mast 7c and is a telescopic type (full free type) whose drive sources are a center lift cylinder 8a and a pair of left and right lift cylinders 8b, 8b (only one shown). To given a detailed explanation, as the center lift cylinder 8a is driven first, only a carriage 9 is lifted upward and as the mast 7 does slide expansion and contraction after the carriage 9 reaches the topmost position of the inner mast 7c, the carriage 9 moves upward and downward. The forks 6 are attached to the carriage 9 and their positions are adjusted upward and downward in accordance with the slide expansion and contraction of the mast 7.

A side shifter 10 is mounted on the carriage 9 so that the side shifter 10 is movable rightward and leftward as a side shift cylinder 11 (see FIG. 9) is driven. The positions of the forks 6 are adjusted rightward and leftward according to the side shifting of the side shifter 10. A tilt cylinder 12 (see FIG. 9) is connected to the carriage 9 and as the tilt cylinder 12 performs a tilt operation, the tilt angles of the forks 6 are adjusted.

Front wheels (driven wheels) 13a are attached to the distal end portions of the individual reach legs 3 and rear wheels (driving wheels) 13b are attached to the vehicle body 2. The rear wheels 13b serve as steered wheels and are driven by the power from a drive motor 14 which is driven by a battery 2a installed in the vehicle body 2 as a power supply. A stand-up type driver's seat 15 is provided at the rear right portion of the vehicle body 2 and as a steering wheel 16 is operated, the rear wheels 13b are steered. The steering wheel 16 is made of a resin and a steering wheel knob 17 of a resin which is gripped by a driver at the time of operating the steering wheel 16 is formed on the top surface of the steering wheel 16.

The forklift 1 has a camera lifting unit 18 assembled to the front center portion of the side shifter 10 in order to support the positioning operation for the forks 6 in a high position (high lifted height range). The camera lifting unit 18 has a camera unit 20 incorporating a camera (CCD camera) 19 as image pickup means so that the camera unit 20 is elevated between a storage position in which it is stored in a housing 21 assembled to the front center portion of the carriage 9 and a lift-down position where it protrudes from the lower end of the housing 21. The position of the camera unit 20 is adjusted in such a way that the unit comes to the storage position at the time of executing a load pickup work to pick up a load (pallet) and comes to the lift-down position at the time of executing a load deposition work to put down the load carried on the forks 6 at a predetermined place.

The camera unit 20 can pick up the image of a cargo carrying work area in front of the forks 6 with a pickup portion (lens) 22 of the camera 19. An image pickup window 23 is formed in the front lower portion of the housing 21 and the image of the cargo carrying work area can be picked up through the image pickup window 23 even from the storage position. That is, the camera 19 can pick up an image of the front (forward) of the forks 6 from two positions, the storage position and the lift-down position, by means of the camera 19. At the time the side shifter 10 shifts sideways, the camera lifting unit 18 moves leftward and rightward, together with the forks 6.

A liquid crystal display device (hereinafter simply written as "display device") 25 as display means is attached to a roof 24, which covers the upper portion of the vehicle body 2, at a location where the driver standing on the driver's seat 15 can see well. The image of an area in front of the forks 6 which is picked up by the camera 19 at the time of cargo carrying work is displayed on a display screen 25a of the display device 25. The driver can do a cargo carrying work while viewing the display screen 25a of the display device 25.

Figure 6:
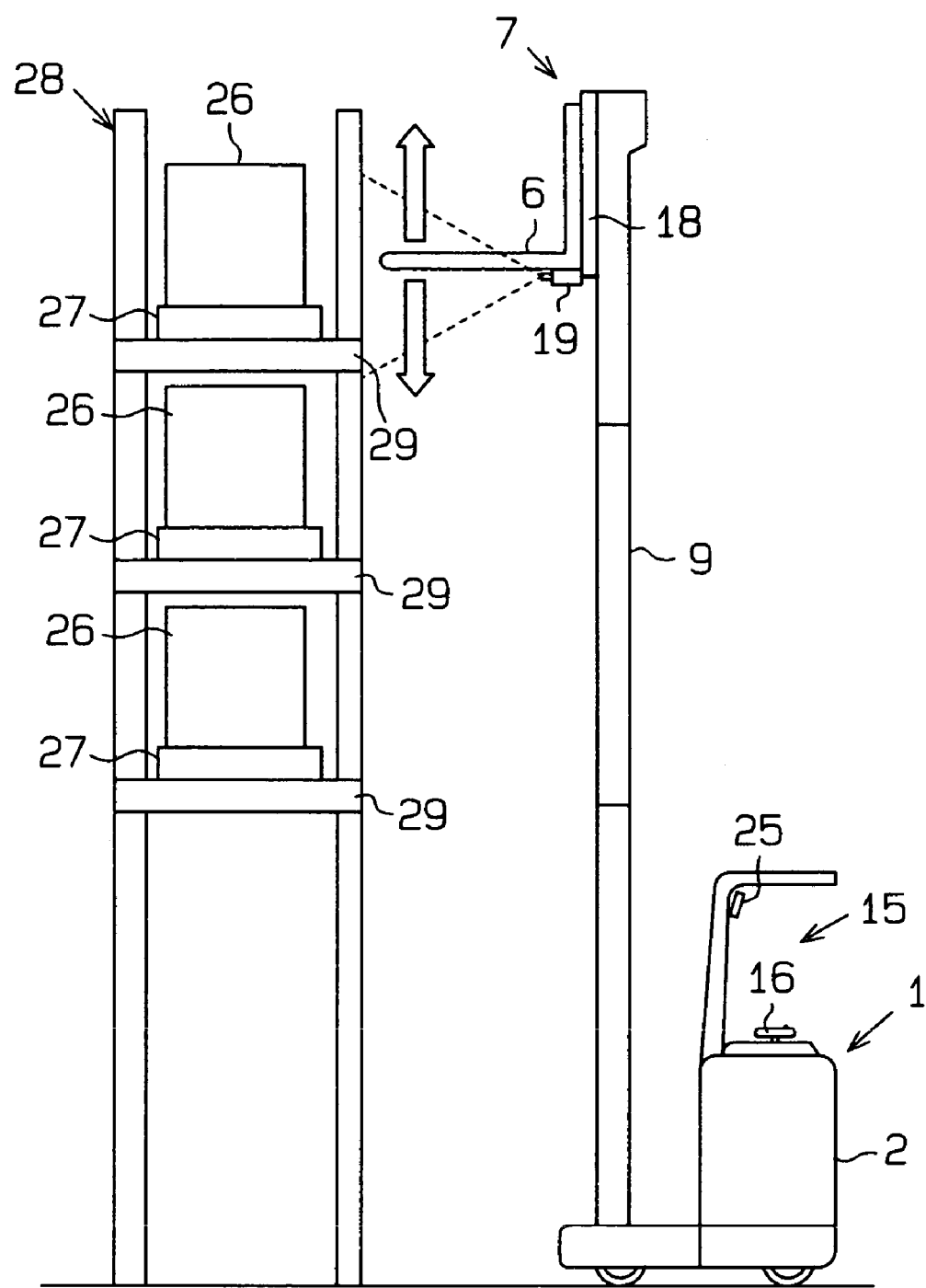
FIG. 6 is an exemplary side view showing a cargo carrying work of the forklift.

FIG. 6 is an exemplary side view when a cargo carrying work is executed by the forklift 1 equipped with the camera 19. The cargo carrying work for loads 26 is carried out with the loads placed on pallets 27. A rack 28 where the loads 26 are to be placed has a multi-stage structure and some has an overall height equal to or higher than twice the height of the forklift 1. If the rack 28 has such a great overall height, there may be cases where the driver cannot see the cargo carrying work from the driver's seat 15 at the time of doing a cargo carrying work at a shelf portion 29 located high. To solve it, the forklift 1 equipped with the camera 19 picks up the image of an area in front of the forks 6 by the camera 19 and automatically position the forks 6 based on the picked-up image, thereby supporting the cargo carrying work.

Figure 7:
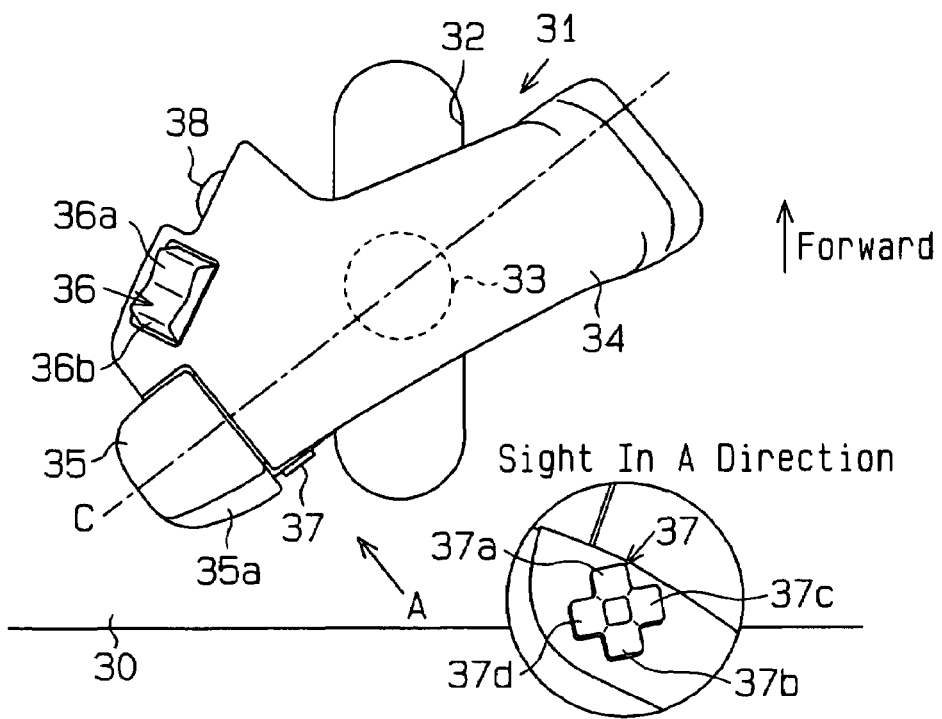
FIG. 7 is a plan view of a multi lever.

FIG. 7 is a plan view of a multi lever. A multi lever 31 is provided on the instrument panel 30. The multi lever 31 can ensure all the operations concerning the driving work and cargo carrying work and has a plurality of operation sections. The multi lever 31 has a lever body 33 which tilts forward and backward along a slot 32 on the instrument panel 30, and the lever body 33 returns to the neutral position, approximately perpendicular to the panel surface when it is not operated, by the urging force of a spring (not shown). Attached to the upper end portion of the lever body 33 is a grip portion 34 in a state where it tilts by about 30 degrees to 60 degrees to the vehicle's widthwise direction.

A lifting knob 35 approximately cylindrical in shape is rotatably provided at the left end portion of the grip portion 34. A seesaw switch 36, a cross switch 37 and an activation switch 38 are provided respectively at the front edge of the left portion of the grip portion 34, the back of the left portion of the grip portion 34 and the front of the left portion of the grip portion 34. The multi lever 31 is operated with the right hand, and the lifting knob 35 or the cross switch 37 can be manipulated with the thumb while holding the grip portion 34 and the seesaw switch 36 or the activation switch 38 can be manipulated with the index finger.

Tilting the lever body 33 forward with the right hand holding the grip portion 34 moves the forklift 1 forward and tilting the lever body 33 backward moves the forklift 1 backward. As a projection 35*a* formed on the lifting knob 35 is pushed upward with the thumb and the knob 35 is turned upward, the forks 6 are lifted upward, and as the projection 35*a* is pushed downward with the thumb and the knob 35 is turned downward, the forks 6 are lifted downward. Pushing a front end 36*a* of the seesaw switch 36 with the index finger moves the mast assembly 4 forward, and pushing a rear end 36*b* of the seesaw switch 36 with the index finger moves the mast assembly 4 backward.

The cross switch 37 is operable in four directions, up, down, left and right, the upward and downward operations manipulate the tilting of the mast 7 and the leftward and rightward operations manipulate the side shifting. That is, pushing an upper end portion 37*a* of the cross switch 37 with the thumb tilts the forks 6 forward and pushing a lower end portion 37*b* of the cross switch 37 tilts the forks 6 rearward. Further, pushing a right end portion 37*c* of the cross switch 37 with the thumb shifts the forks 6 rightward and pushing a left end portion 37*d* of the cross switch 37 shifts the forks 6 leftward.

Figure 1:
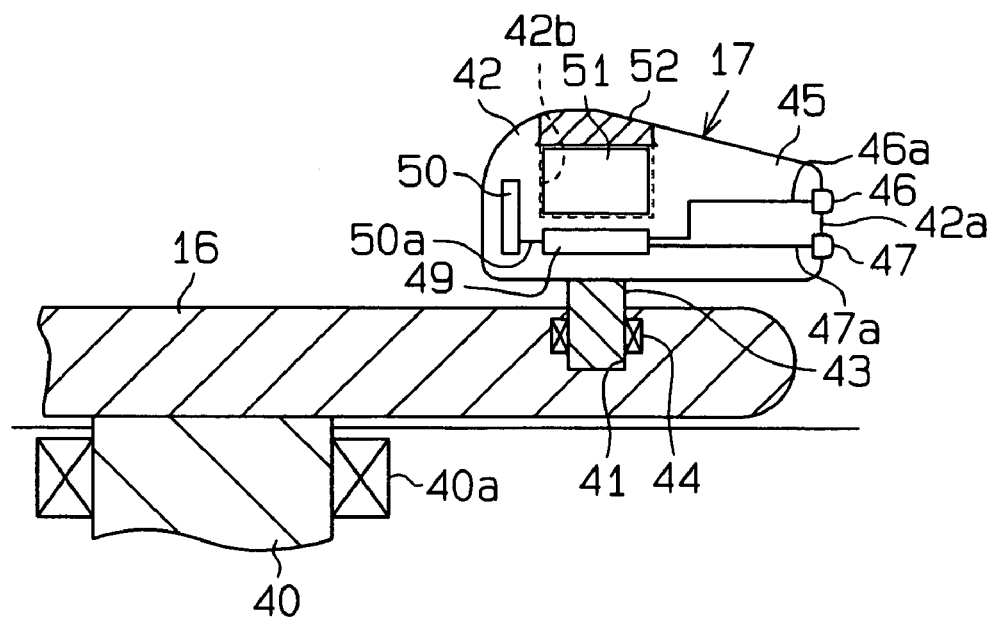
FIG. 1 is an exemplary cross-sectional view of a steering wheel knob of a forklift according to a first embodiment of the present invention.
Figure 2:
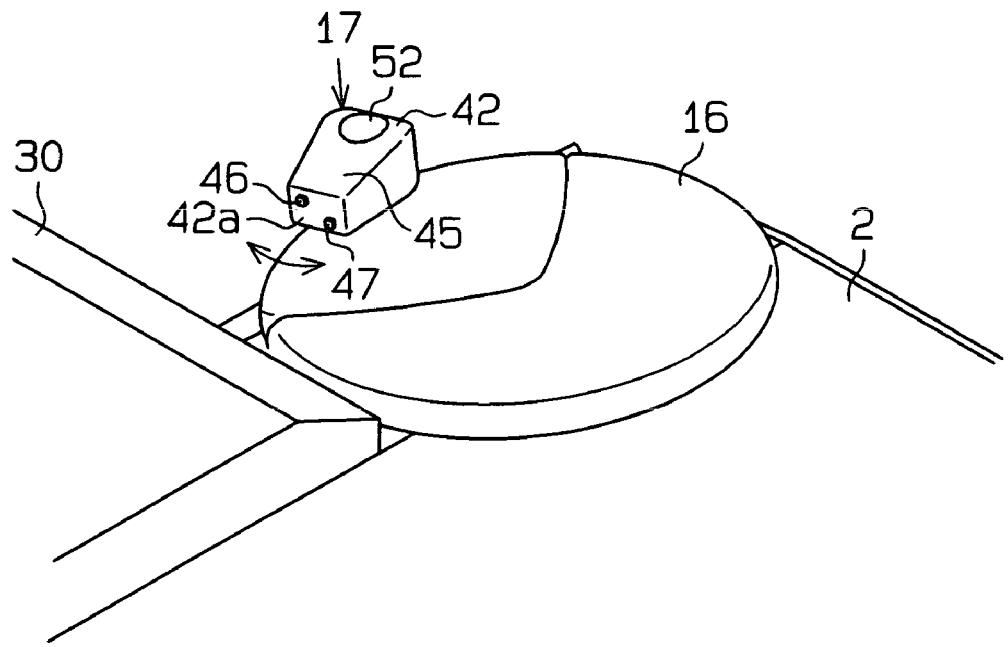
FIG. 2 is a perspective view seeing a driver's seat from the front.

FIG. 1 is an exemplary cross-sectional view of the steering wheel knob 17, and FIG. 2 is a perspective view seeing the driver's seat 15 from the front. The steering wheel 16 has a steering shaft 40 coupled to the vehicle body 2 via a bearing 40*a*. Formed in the diametric end portion of the steering wheel 16 is an engage hole 41 to which a shaft portion 43 sticking out of a knob body 42 is coupled via a bearing 44. Accordingly, the steering wheel knob 17 is relatively rotatable around the shaft portion 43 in the directions of arrows in FIG. 2 with respect to the steering wheel 16. The outer shape of the knob body 42 extends in an approximately rectangular parallelepiped shape away from the shaft portion 43, and the extending portion is formed as a holding portion 45 to hold the steering wheel knob 17.

Formed on a flat surface portion 42*a* of the knob body 42 are a load pickup mode switch 46 and a load deposition mode switch 47 for manually setting the operation mode for the cargo carrying work. Those two switches 46 and 47 are wireless switches and can radio-communicate with a controller 48 (see FIG. 9) to be discussed later. Of the two switches 46 and 47, depressing the load pickup mode switch 46 sets the operation mode to the "load pickup mode" and depressing the load deposition mode switch 47 sets the operation mode to the "load deposition mode".

The knob body 42 incorporates a transmission circuit 49, an antenna 50 and a battery 51. The load pickup mode switch 46 and the load deposition mode switch 47 are connected to the input side of the transmission circuit 49 via signal lines 46*a* and 47*a* and the antenna 50 is connected to the output side via a signal line 50*a*. When the load pickup mode switch 46 or the load deposition mode switch 47 is depressed, therefore, the transmission circuit 49 sends a switch signal corresponding to the switch 46, 47 to the controller 48 via the antenna 50 by radio wave.

A retaining portion 42*b* for retaining the battery 51 is formed in the knob body 42. The retaining portion 42*b* is openable and closable with a lid 52 and when the battery 51 is dead, battery replacement is to be performed with the lid 52 removed. The battery 51 is the power supply for the wireless switches on the steering wheel knob 17, i.e., feeds power to the load pickup mode switch 46, the load deposition mode switch 47 and the transmission circuit 49. The two switches 46 and 47, the transmission circuit 49 and the antenna 50 constitute input means and the switches 46 and 47 are equivalent to the operation section (mode changeover switch) and the transmission circuit 49 and the antenna 50 to the transmission section.

Figure 3:
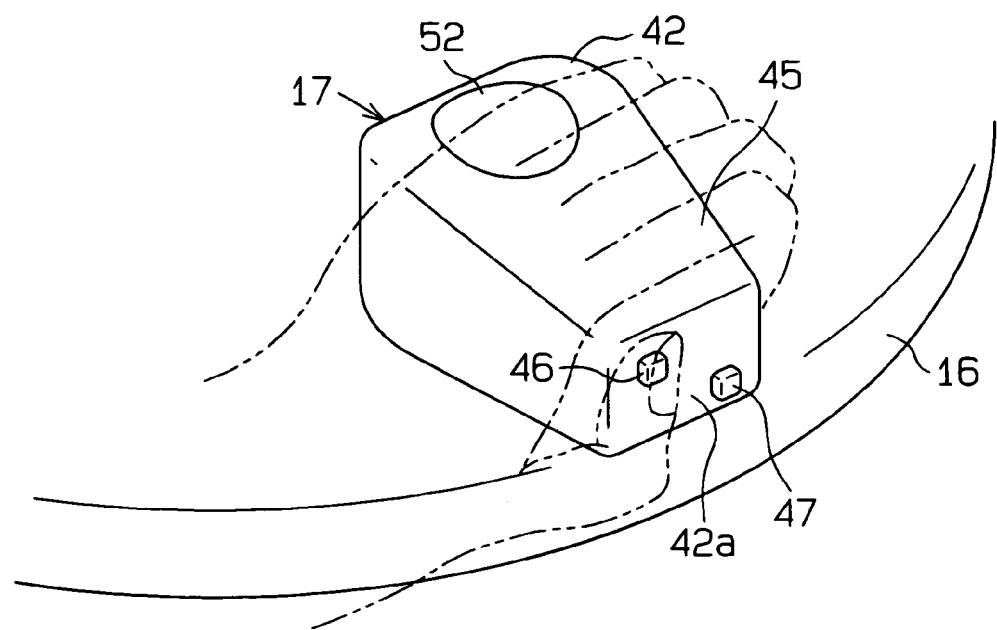
FIG. 3 is a perspective view showing the state in which the steering wheel knob is used.
Figure 4:
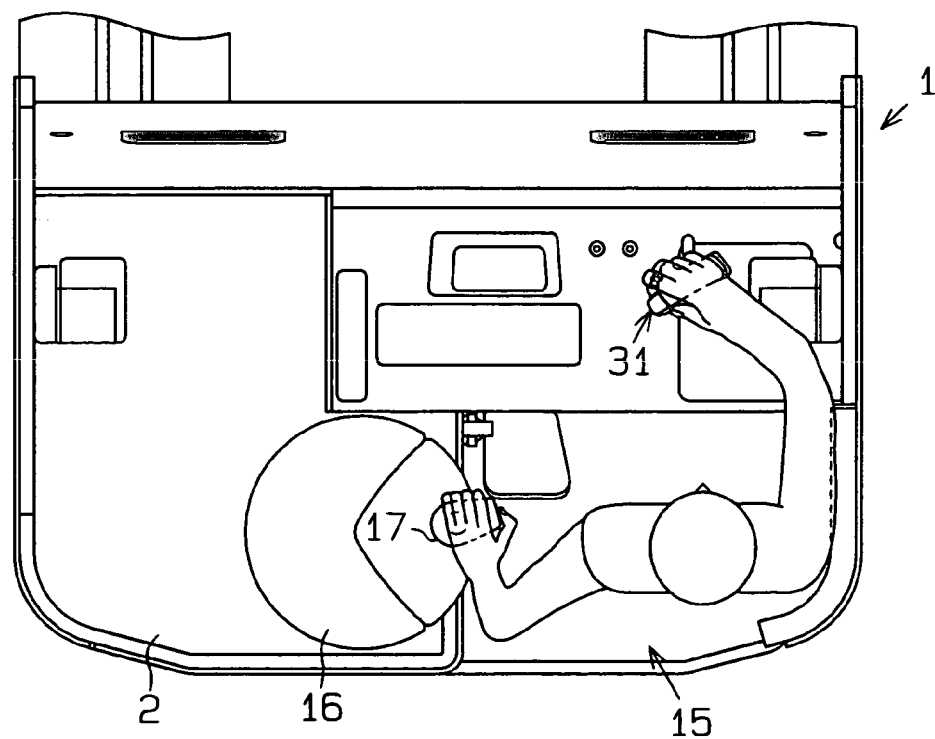
FIG. 4 is a plan view seeing the driver's seat from above.

FIG. 3 is a perspective view showing the state in which the steering wheel knob 17 is used and FIG. 4 is a plan view seeing the driver's seat 15 from above. The steering wheel knob 17 is held with a left hand in a holding state where the thumb of the left hand is positioned at the flat surface portion 42*a* of the knob body 42 with the remaining four fingers gripping the holding portion 45. With the steering wheel knob 17 held, one of the load pickup mode switch 46 and the load deposition mode switch 47 is manipulated with the thumb of the left hand.

As shown in FIG. 4, the driver standing on the driver's seat 15 grips the multi lever 31 with the right hand with the right elbow placed down and grips the steering wheel knob 17 with the left hand. This can allow the driver to simultaneously operate the multi lever 31 and the steering wheel 16 (steering wheel knob 17). Because the steering wheel knob 17 turns around the shaft portion 43 (see FIG. 1) at the time of turning the steering wheel 16, the steering wheel knob 17 takes a suitable position to the driver however much the steering wheel 16 is turned.

Figure 8:
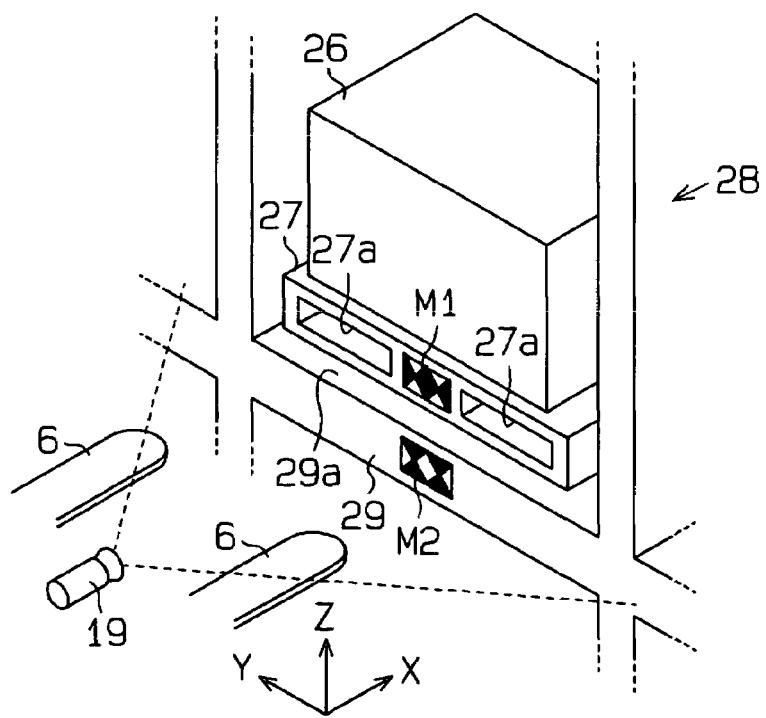
FIG. 8 is an explanatory diagram about automatic fork position control.

FIG. 8 is an explanatory diagram about automatic fork positioning control which automatically positions the forks. The pallets 27 and the rack 28 are affixed with marks M1 and M2 as marks to obtain the relative positions of the forks 6 to the pallets 27 and the rack 28. Specifically, the mark M1 is affixed to the center between two insertion holes 27*a*, 27*a* at a side (front side) of the pallet 27. The mark M2 is affixed to the front center of the shelf portion 29 of the rack 28. While the mark M1 affixed to the pallet 27 and the mark M2 affixed to the rack 28 are identical in pattern, the black and white of the patterns are inverted. When the automatic fork positioning control to automatically position the forks 6 is executed, the forks 6 are automatically positioned with those marks M1 and M2 as the targets.

In short, in the load pickup mode to perform the load pickup work, the forks 6 are automatically positioned, targeting the mark M1 affixed on the pallet 27, in such a way as to face the insertion holes 27*a* of the pallet 27. In the load deposition mode to perform the load deposition work, the forks 6 are automatically positioned, targeting the mark M2 affixed on the rack 28, in such a way that the forks 6 are positioned at a predetermined height above a shelf surface (deposition surface) 29a of the shelf portion 29 (a height of, for example, 10 to 20 cm above the shelf surface 29a) and the middle point of the two forks 6 come to nearly the same position as the mark M2. The positioning of the forks 6 is carried out by moving the forks 6 upward or downward (in a z direction in the diagram) by driving the lift cylinder 8b and by moving the forks 6 leftward or rightward (in a y direction in the diagram) by driving the side shift cylinder 11.

Figure 9:
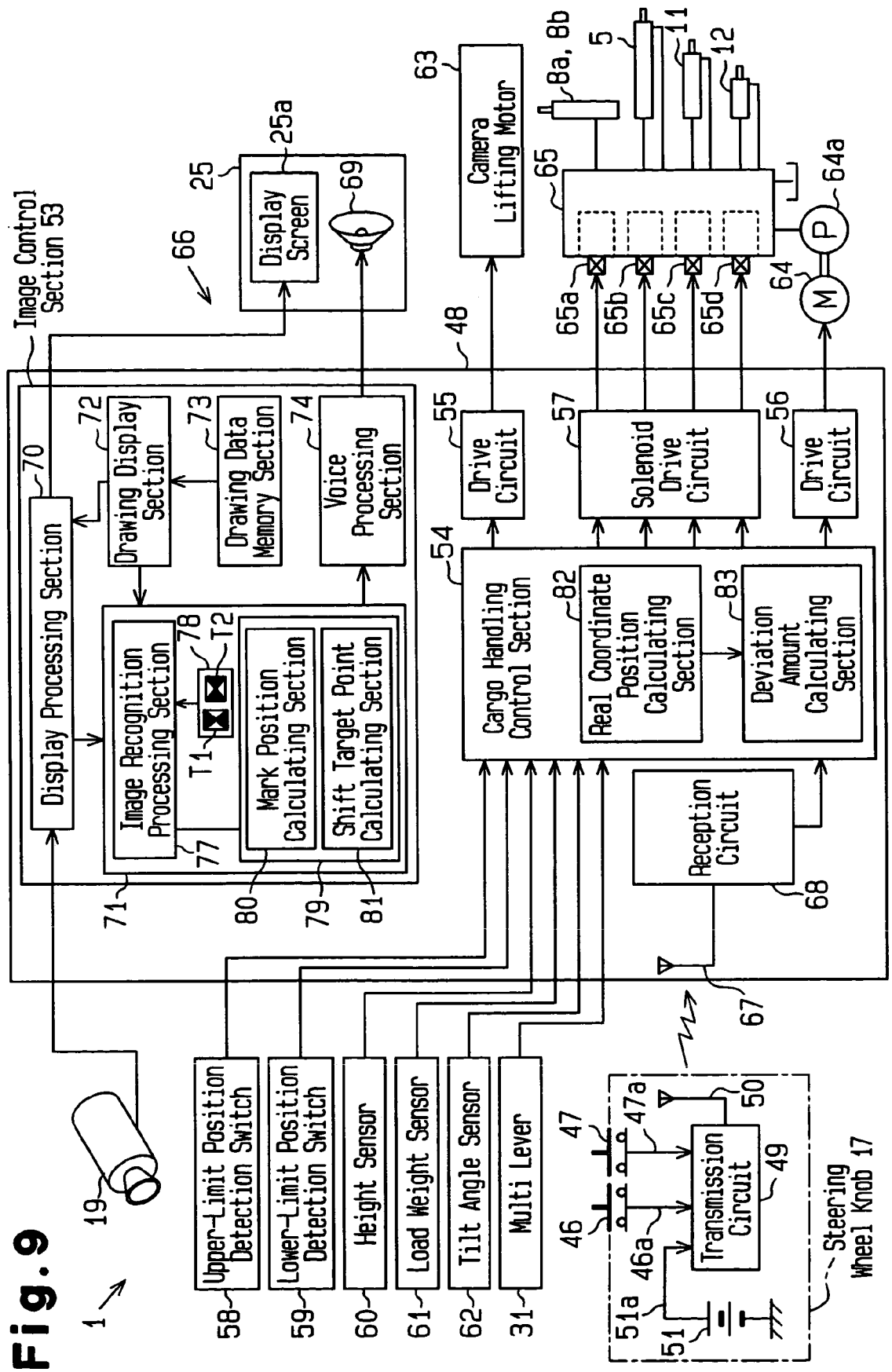
FIG. 9 is a block circuit diagram illustrating the electrical structure of the forklift.

FIG. 9 illustrates the electrical structure of the forklift 1. The forklift 1 has the controller 48 which has an image control section 53, a cargo handling control section 54, drive circuits 55 and 56 and a solenoid drive circuit 57. An upper-limit position detection switch 58, a lower-limit position detection switch 59, a height sensor 60, a load weight sensor 61 and a tilt angle sensor 62 are connected to the input side of the cargo handling control section 54. A lever potentiometer which detects the amount of displacement in the lever body 33 of the multi lever 31, a knob potentiometer (neither illustrated) which detects the amount of displacement in the lifting knob 35 and various switches 36 to 38 (see FIG. 7) are connected to the input side of the cargo handling control section 54.

A camera lifting motor 63 and a cargo carrying motor (electric motor) 64 are connected to the output side of the cargo handling control section 54 respectively via the drive circuits 55 and 56. The solenoids of various electromagnetic proportional valves 65a to 65d assembled to an oil control valve 65 are connected to the output side of the cargo handling control section 54 via the solenoid drive circuit 57. Those electromagnetic proportional valves 65a to 65d are respectively connected to the lift cylinders 8a, 8b, the reach cylinder 5, the side shift cylinder 11 and the tilt cylinder 12.

The cargo handling control section 54 performs current value control of the electromagnetic proportional valves 65a to 65d and drive control of the cargo carrying motor 64 based on an operation signal from the multi lever 31. As the action of the cargo carrying motor 64 drives a cargo carrying pump (hydraulic pump) 64a, a hydraulic fluid is supplied to the oil control valve 65. When the multi lever 31 is manipulated, the individual electromagnetic proportional valves 65a to 65d corresponding to the manipulation are subjected to proportional control based on an operation signal from the multi lever 31, so that the lift cylinders 8a, 8b, the reach cylinder 5, the side shift cylinder 11 and the tilt cylinder 12 are hydraulically controlled to carry out the lifting operation, reaching operation, side shifting operation and tilting operation of the forks 6.

The height sensor 60 detects if the forks 6 are at a height (lifted height) equal to or higher than the set height and comprises a height switch which is switched on or off when, for example, the carriage 9 comes to the topmost position of the inner mast 7c and the inner mast 7c slides. The height sensor 60 may be a sensor which can continuously detect the lifted height of the forks 6. For example, a reel type height sensor that detects the amount of rotation of a reel from which a wire is fed out or wound up in accordance with the elevation of the carriage 9 and an ultrasonic type height sensor that detects a cylinder stroke from the measured time from the point an ultrasonic wave traveling in the fluids in the lift cylinders 8a, 8b has been reflected at the piston to the point it returns may be employed as the height sensor 60.

The load weight sensor 61 detects the weight of a load (load weight) carried on the forks 6 and comprises a pressure sensor which detects the hydraulic pressures in the lift cylinders 8a, 8b in this embodiment. The load weight sensor 61 outputs a detection signal which has a voltage value according to the weight of the load on the forks 6. The tilt angle sensor 62 detects the tilt angle with the angle of the forks 6 in the horizontal position (horizontal angle) as a reference, and comprises, for example, a potentiometer.

The forklift 1 has an automatic fork positioning system (lock-on system) 66. The lock-on system 66 executes an image recognition process on the marks M1 and M2 based on image data picked up by the camera 19 or automatic position control on the forks 6 with the set mark M1 (M2) as a target. The lock-on system 66 comprises units needed for image recognition process of the marks and automatic position control of the forks 6, such as the camera 19, the image control section 53, the cargo handling control section 54, the display device 25, the activation switch 38 and the wireless switch mechanisms which set the operation mode through a manual operation, and the like.

The cargo handling control section 54 sets the operation mode of the lock-on system 66 to one of the load pickup mode and the load deposition mode based on the detected value from the load weight sensor 61. That is, when the load obtained from the detected value from the load weight sensor 61 is equal to or smaller than the set value (load W ? set value Wo), the cargo handling control section 54 determines that "no load" which is no loads carried on the forks 6 and sets the operation mode to the "load pickup mode". When the load obtained from the detected value from the load weight sensor 61 exceeds the set value (load W>set value Wo), on the other hand, the cargo handling control section 54 determines that "load present" which is a load carried on the forks 6 and sets the operation mode to the "load deposition mode".

Accordingly, the operation mode is automatically set based on the load on the forks 6 irrespective of the operation by the operator. As the detected value from the load weight sensor 61 includes the weight of the carriage 9 or the like, a value which is the detected value with an empty load or a little margin added to that detected value is set to the set value Wo. For example, it is desirable to set the set value Wo which can be determined as "load present" when only a pallet 27 is carried. The process of setting the operation mode is executed every given time (e.g., several tens of msec).

The setting of the operation mode of the lock-on system 66 is not limited to automatic execution based on the detected value from the load weight sensor 61 but it can be manually set by depressing the two switches 46 and 47 of the steering wheel knob 17, which will be elaborated below. The cargo handling control section 54 is connected with a reception circuit 68 having an antenna 67. The antenna 67 and the reception circuit 68 are disposed in the instrument panel 30.

The reception circuit 68 receives a radio wave, launched from the antenna 50 of the steering wheel knob 17, via the antenna 67 and outputs a reception signal corresponding to the radio wave to the cargo handling control section 54. The intensity of the radio wave transmitted from the steering wheel knob 17 is set in such a way that the entire area of the vehicle body 2 is the transmission range. In the mode setting of the operation mode, of automatic setting of the operation mode based on the detected value from the load weight sensor and manual setting using the two switches 46, 47, the manual setting has a priority. The antenna 67 and the reception circuit 68 constitute a reception section.

When the load pickup mode switch 46 is operated, for example, the reception circuit 68 receives the switch signal for setting the load pickup mode, transmitted by radio wave from the antenna 50, via the antenna 67 and outputs a reception signal according to that signal to the cargo handling control section 54. Based on the reception signal, the cargo handling control section 54 sets the operation mode of the lock-on system 66 to the "load pickup mode". Likewise, when the load deposition mode switch 47 is operated, the reception circuit 68 receives the switch signal for setting the load deposition mode by radio wave via the antennae 50 and 67, and outputs a reception signal according to that signal to the cargo handling control section 54. Based on the reception signal, the cargo handling control section 54 sets the operation mode of the lock-on system 66 to the "load deposition mode".

In addition to the cargo carrying control at the time of operating the multi lever, the cargo handling control section 54 performs the lifting control of the camera unit 20 and the automatic fork position control. The cargo handling control section 54 executes the automatic position control only when the height of the forks 6 detected by the height sensor 60 is equal to or greater than the set height (e.g., about 2 meters). As the camera unit lifting control, the cargo handling control section 54 places the camera unit 20 in the storage position in load pickup mode and places the camera unit 20 in the lift-down position in load deposition mode. The driving of the camera lifting motor 63 is stopped when the camera unit 20 reaches the upper limit position and the upper-limit position detection switch 58 is turned on and when the camera unit 20 reaches the lower limit position and the lower-limit position detection switch 59 is turned on.

The camera 19 is connected to the input side of the image control section 53 and the display device 25 is connected to the output side. The display device 25 has the display screen 25a and a speaker 69 as output means, and the image control section 53 displays the image (video image) on the display screen 25a and causes the speaker 69 to generate a predetermined sound. To acquire the amount of deviation of the forks 6 at the time of the automatic fork position control, the image control section 53 executes image processing based on image data acquired from the camera 19.

The image control section 53 has a display processing section 70, an image processing section 71, a drawing display section 72, a drawing data memory section 73 and a voice processing section 74. The display processing section 70 outputs a video signal, input from the camera 19, to the display device 25 in such a way that the image picked up by the camera 19 is displayed on the screen. The image processing section 71 receives the image data from the display processing section 70, performs an image recognition process based on the image data and calculates the coordinates of the marks M1 and M2, the coordinates of a shift target point 75 or the like on the display screen 25a of the display device 25 (the screen coordinate system shown in FIG. 12(a)).

Based on the results of the processing of the image processing section 71, the drawing display section 72 displays the drawing of the shift target point 75 and a target line 76 (see FIG. 14 for both) or the like on the display screen 25a as drawing data stored in the drawing data memory section 73. The drawing display section 72 respectively displays, on the display screen 25a, the "load pickup mode" (see FIG. 14) when the operation mode is the load pickup mode and the "load deposition mode" (see FIG. 15) when the operation mode is the load deposition mode.

The image processing section 71 has an image recognition processing section 77, a template memory section 78 and a screen coordinate position calculating section 79. The screen coordinate position calculating section 79 has a mark position calculating section 80 and a shift target point calculating section 81. The cargo handling control section 54 has a real coordinate position calculating section 82 and a deviation amount calculating section 83. The following will describe the contents of the processes performed by the image control section 53 and the cargo handling control section 54 at the time of the automatic fork position control according to FIGS. 10 to 13.

Figure 10A:
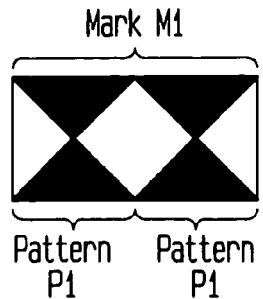
FIG. 10(a) is a front view of a mark.
Figure 10B:
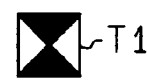
FIG. 10(b) is a front view of a template corresponding to FIG. 10(a).
Figure 10C:
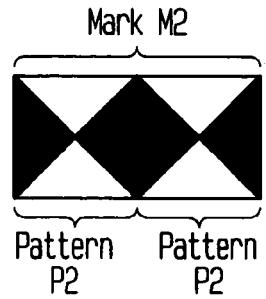
FIG. 10(c) is a front view of a mark.
Figure 10D:
FIG. 10(d) is a front view of a template corresponding to FIG. 10(c).

Stored in the template memory section 78 are a template T1 for the mark M1 and a template T2 for the mark M2. That is, the mark M1 shown in FIG. 10(a) is constituted by two patterns P1, P1 aligned next to each other shown in FIG. 10(b). The mark M2 shown in FIG. 10(c) is constituted by two patterns P2, P2 aligned next to each other shown in FIG. 10(d). A mark indicates an overall design and a pattern indicates two designs constituting a mark. The templates T1 and T2 to be used in the pattern matching process have the same designs as the patterns P1 and P2.

The patterns P1, P2 of the two marks M1 and M2 are designed with the black and white patterns inverted to each other. Each pattern P1, P2 has a design separated into white and black colors by a plurality of boundary lines extending straight radially around one point. Each pattern P1, P2 in the present embodiment has a design separated into white and black colors by four areas defined by the two diagonal lines of a square. It is to be noted that the contour line equivalent to the sides of the rectangular shape of the template is not a part of the design.

As designs of this type are used for the patterns P1, P2, a pattern with the same size as that of the template T1, T2 always exists in the center of the picked-up patterns P1, P2 even if the sizes of the marks M1 and M2 displayed on the display screen 25a change in accordance with a difference in the distance between the marks and the camera. Therefore, the image recognition processing section 77 can recognize the marks M1, M2 through pattern matching using only a single template T1, T2. The templates T1, T2 are set to predetermined sizes from which the marks M1, M2 should be recognized, and the marks M1, M2 picked up within a predetermined distance are all recognizable.

Figure 12A:
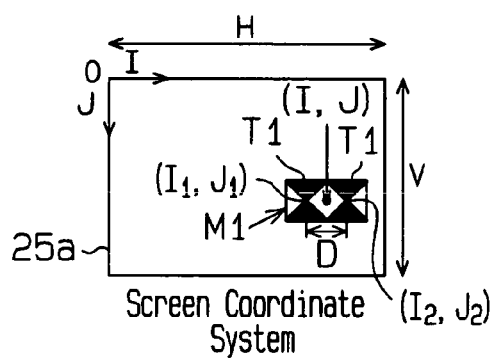
FIG. 12(a) is a screen diagram showing a screen coordinate system set on a screen.
Figure 12B:
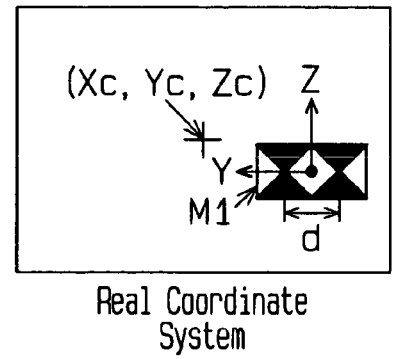
FIG. 12(b) is a display diagram showing real coordinates.

FIG. 12(a) is a screen diagram showing a screen coordinate system set on the screen and the coordinates are handled in the units of pixels in the screen coordinate system. In the diagram, H is the number of horizontal pixels of the display screen 25a of the display device 25 and V is the number of vertical pixels of the display screen 25a. FIG. 12(b) is a display diagram showing real coordinates and has a similar relation to the screen diagram in FIG. 12(a).

Figure 11:
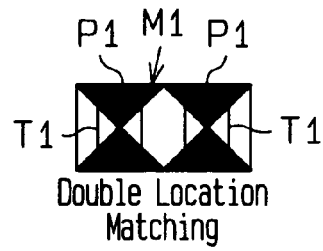
FIG. 11 is an explanatory diagram about double location matching.

Based on image data acquired from the camera 19, the image recognition section 77 performs an image recognition process (pattern matching process) at two locations of the patterns P1, P1 as shown in FIG. 11 by using the template T1 in load pickup mode and the template T2 in load deposition mode. Then, the image recognition section 77 recognizes the marks M1 and M2 on the display screen 25a of the display device 25 or in the screen coordinate system.

That is, in case where the operation mode is the load pickup mode and the mark M1 is recognized as shown in FIG. 12(a), the image recognition section 77 performs matching on the two patterns P1, P1 constituting the mark M1 at two locations using the template T1 and recognizes each pattern P1, P1. Likewise, in case where the operation mode is the load deposition mode, each pattern P2, P2 is recognized through matching on the two patterns P2, P2 constituting the mark M2 at two locations using the template T2.

After pattern recognition, the mark position calculating section 80 computes coordinates (I1, J1), (I2, J2) of the center points (radial center points) of the individual patterns P1, P1 in the screen coordinate system. Then, the mark position calculating section 80 computes the barycentric coordinates (I, J) of the mark M2 and a center distance D of the patterns P1, P1 based on those two coordinate values. In case where the operation mode is the load deposition mode, the barycentric coordinates of the mark M2 and the center distance of the patterns P2, P2 are computed in procedures similar to those for the mark M1.

The real coordinate position calculating section 82 performs geometric conversion using the values of the barycentric coordinates (I, J) and the center distance D of the screen coordinate system to compute three-dimensional relative positional coordinates (Xc, Yc, Zc) with respect to the mark M of the camera 19 in a real coordinate system (XYZ coordinate system) shown in FIG. 12(b). The coordinates (Xc, Yc, Zc) of the camera 19 are computed by following equations.

$$Xc = -Hd/(2D \tan \alpha) \quad (1)$$

$$Yc = d/D(I - H/2) \quad (2)$$

$$Zc = d/D(J - V/2) \quad (3)$$

Figure 13:
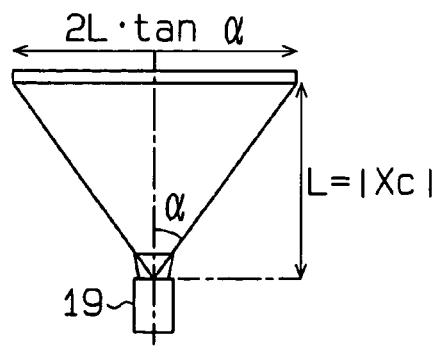
FIG. 13 is an explanatory diagram for explaining a calculation method at the time of obtaining a camera position.
Figure 14A:
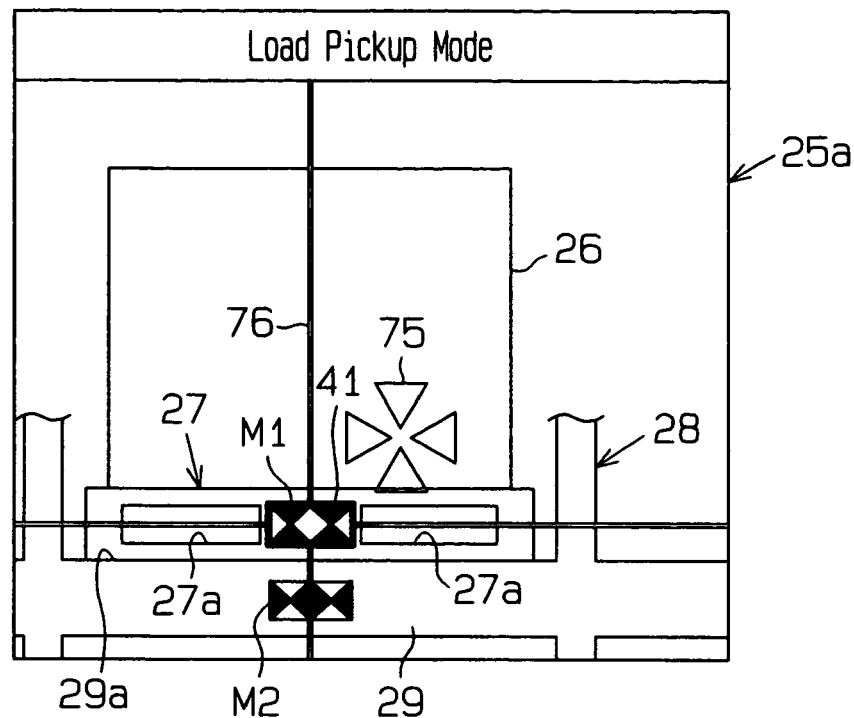
FIG. 14(a) is a front view of the display screen showing a load pickup mode before forks are positioned.
Figure 14B:
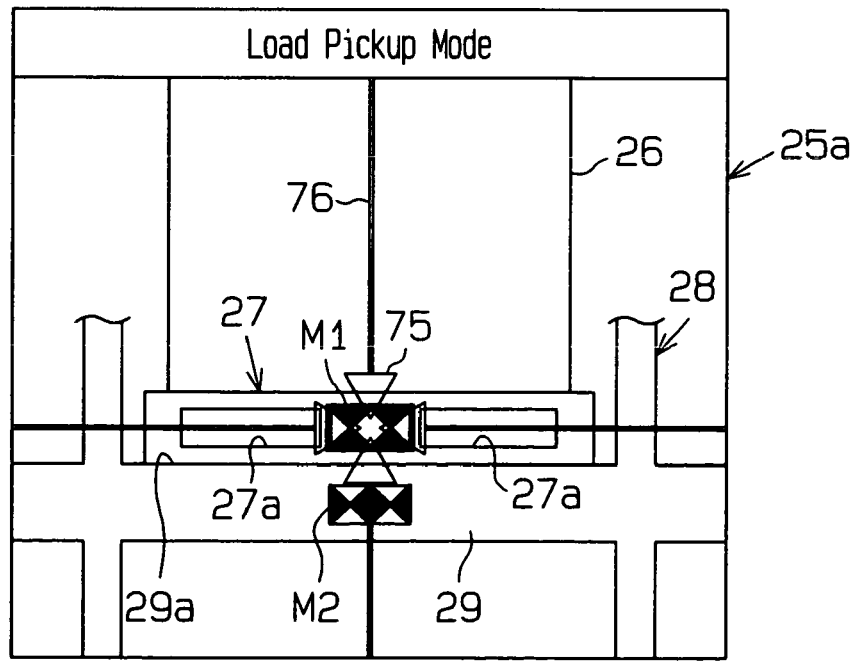
FIG. 14(b) is a front view of the display screen showing the load pickup mode after the forks are positioned.
Figure 15A:
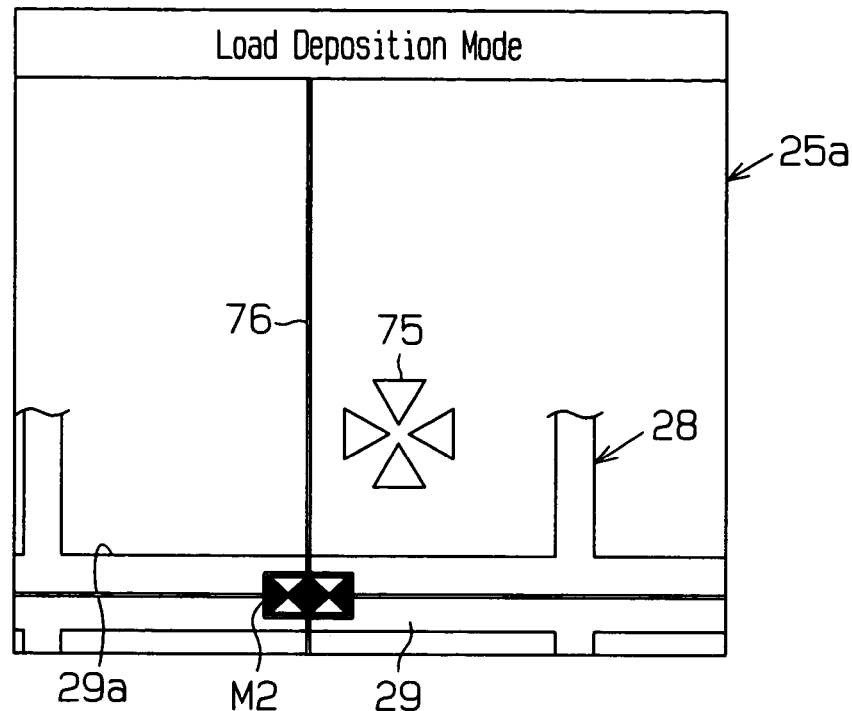
FIG. 15(a) is a front view of the display screen showing a load deposition mode before the forks are positioned.
Figure 15B:
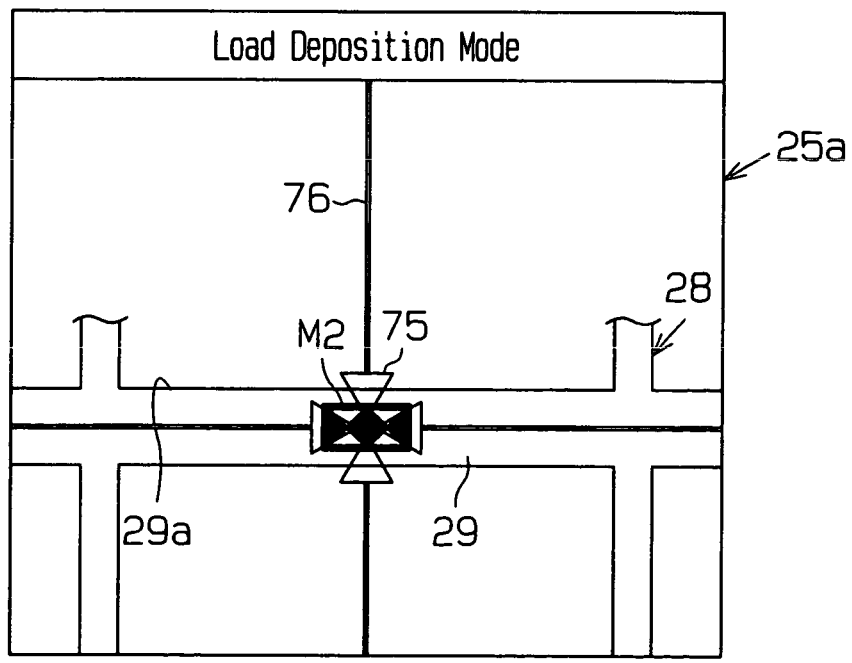
FIG. 15(b) is a front view of the display screen showing the load deposition mode after the forks are positioned.

Here, "$\alpha$" is a half of the horizontal angle of view of the camera 19 shown in FIG. 13, and d is the center distance of the two patterns P1, P1 of the mark M1 in the real coordinate system. As the values of H, V, $\alpha$ and d are known values, the dimensional relative positional coordinates (Xc, Yc, Zc) of the camera 19 are obtained if the values of I, J and D are computed. Thereafter, the deviation amount calculating section 83 computes the amount of positional deviation of the forks 6 based on the relative positional coordinates (Xc, Yc, Zc) of the camera 19 acquired by using the equations (1) to (3). Then, at the time the automatic fork position control is executed, the cargo handling control section 54 drives the lift cylinder 8b and the side shift cylinder 11 based on the deviation amount calculated by the deviation amount calculating section 83 and executes positioning of the forks 6.

A description will now be given of the procedures at the time of manually setting the operation mode and executing the automatic fork position control.

In case where the operation mode is manually set at the time of performing a load pickup work, the load pickup mode switch 46 of the steering wheel knob 17 is depressed. Then, the transmission circuit 49 transmits a radio signal for setting the load pickup mode toward the controller 48 via the antenna 50. Then, the reception circuit 68 receives the radio signal via the antenna 67 and outputs a reception signal according to the radio signal to the cargo handling control section 54. Accordingly, the cargo handling control section 54 sets the operation mode to the "load pickup mode" based on the input reception signal and "load pickup mode" is displayed on the display screen 25a as shown in FIG. 14.

When the activation switch 38 is depressed after setting the operation mode, the cargo handling control section 54 executes the automatic fork position control in load pickup mode. In case of the load pickup mode shown in FIG. 14, the mark M1 is recognized as a target and the target line 76 is drawn on the mark M1 on the display screen 25a. When the automatic fork position control is executed, the forks 6 come to a state shown in FIG. 14(b) where the mark M1 matches with the shift target point 75 from a state shown in FIG. 14(a) where the forks 6 are deviated with respect to the pallet 27, and the forks 6 are in a position suitable for load pickup.

In case where the operation mode is manually set at the time of performing a load deposition work, on the other hand, the load deposition mode switch 47 of the steering wheel knob 17 is depressed. Then, the transmission circuit 49 transmits a radio signal for setting the load deposition mode toward the controller 48 via the antenna 50. Then, the reception circuit 68 receives the radio signal via the antenna 67 and outputs a reception signal according to the radio signal to the cargo handling control section 54. Accordingly, the cargo handling control section 54 sets the operation mode to the "load deposition mode" based on the input reception signal and "load deposition mode" is displayed on the display screen 25a as shown in FIG. 15.

When the activation switch 38 is depressed after setting the operation mode, the cargo handling control section 54 executes the automatic fork position control in load deposition mode. In case of the load deposition mode shown in FIG. 15, the mark M2 is recognized as a target and the target line 76 is drawn on the mark M2 on the display screen 25a. When the automatic fork position control is executed, the forks 6 come to a state shown in FIG. 15(b) where the mark M2 matches with the shift target point 75 from a state shown in FIG. 15(a) where the forks 6 are deviated with respect to the shelf surface 29a, and the forks 6 are in a position suitable for load deposition.

Therefore, wireless switches are used for the load pickup mode switch 46 and load deposition mode switch 47 and wireless communication is executed with the controller 48 by radio wave. In case where the two switches 46 and 47 are connected to the controller 48 by wires (harnesses), there arises a problem that the harnesses are disconnected by slide friction and interference at the time the steering wheel 16 is steered. The use of wireless switches for the two switches 46 and 47 as in this embodiment does not raise the problem.

Particularly, in the structure of the present embodiment, the steering wheel knob 17 is relatively rotatable around the shaft portion 43 with respect to the steering wheel 16. Therefore, the steering wheel knob 17 turns frequently in accordance with the steering operation, and if the two switches 46 and 47 are connected to the controller 48 by wires in this structure, disconnection of the wires becomes particularly noticeable. As the two switches 46 and 47 are connected to the controller 48 wirelessly, however, the steering wheel knob 17 being rotatable relatively to the steering wheel 16 does not raise any problem.

Because the steering wheel knob 17 is provided with the load pickup mode switch 46 and the load deposition mode switch 47, the two switches 46 and 47 can be manipulated while gripping the steering wheel knob 17. Even in case where the switches 46 and 47 are depressed to change the operation mode, therefore, it is unnecessary to direct the position of line of sight of the driver toward the switch section, thereby improving the working efficiency at the time of driving the forklift. The position of line of sight of the driver being invariable leads to an improvement on the safety at the time of driving the forklift.

Further, as the multi lever is operated with the right hand and the steering wheel 16 is operated with the left hand at the time of driving the forklift, each of the operations of cargo carrying, driving and steering and the two switches 46 and 47 which switch the operation mode can be operated simultaneously. This eliminates the need to pass the lever (including the knob) from one hand to the other at the time of performing the operations of cargo carrying, driving and steering and operating the two switches 46 and 47, further contributing to an improvement on the working efficiency at the time of driving the forklift.

Because the switches 46 and 47 provided on the steering wheel knob 17 are constituted by wireless switches in this embodiment, a problem, such as disconnection, which may occur in the case of wiring does not arise. It is also possible to operate the switches 46 and 47 while keeping gripping the steering wheel knob 17.

Further, when the steering wheel knob 17 is rotatable around the shaft portion 43 relatively to the steering wheel 16, connecting the two switches 46 and 47 and the controller 48 by wires makes the problem of disconnection prominent. As the switches 46 and 47 are connected to the controller 48 wirelessly, however, this problem is avoided.

In addition, as the load pickup mode switch 46 and the load deposition mode switch 47 are provided on the steering wheel knob 17, the steering operation and the switch operation for automatic fork position control can be executed simultaneously, thereby ensuring an improvement on the working efficiency of the cargo carrying operation.

As the battery 51 for supplying power to the wireless switches is built in the steering wheel knob 17, it is unnecessary to lay interconnections to supply power to the wireless switches in the steering wheel knob 17 or the steering wheel 16, so that the problem of disconnection or the like is avoided.

The embodiment is not limited to what has been discussed above, but may be modified in the following forms, for example.

Figure 16:
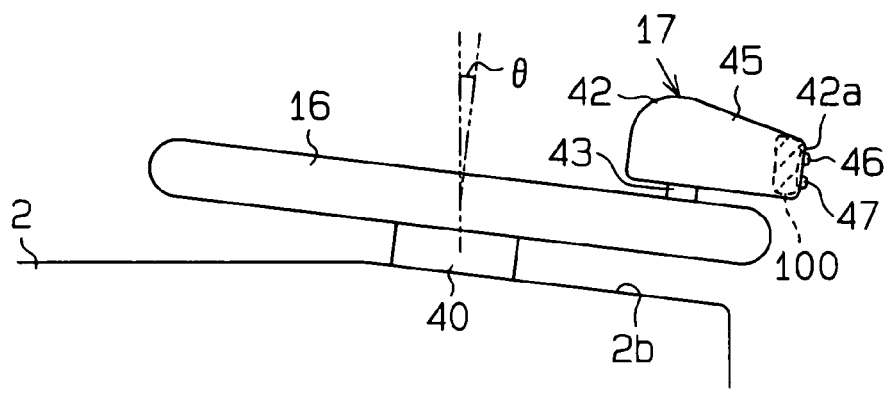
FIG. 16 is a side view of a steering wheel in another example.
Figure 17:
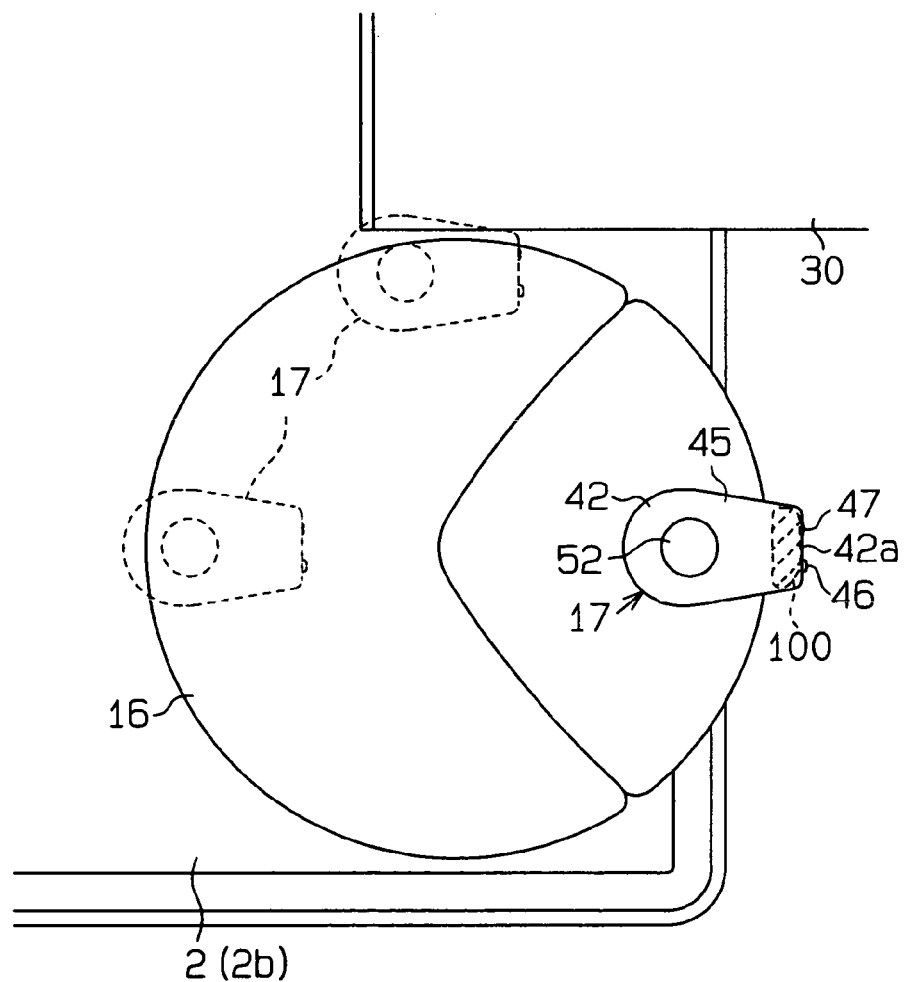
FIG. 17 is a plan view of FIG. 16.

The steering wheel knob 17 may be constructed in such a way as to automatically return to the initial position. As shown in FIGS. 16 and 17, for example, the steering wheel 16 is mounted to an inclined surface 2b tilted by an angle è and a weight 100 as urging means is buried in the distal end of the knob body 42. Accordingly, however much the steering wheel knob 17 is turned, as shown in FIG. 17, it comes to the initial position by the dead weight of the weight 100 or to a state in which the weight 100 is positioned on the side along the inclined surface 2b. Therefore, the load pickup switches 46, 47 automatically face toward the driver, thus improving the operability of the two switches 46 and 47.

Figure 18:
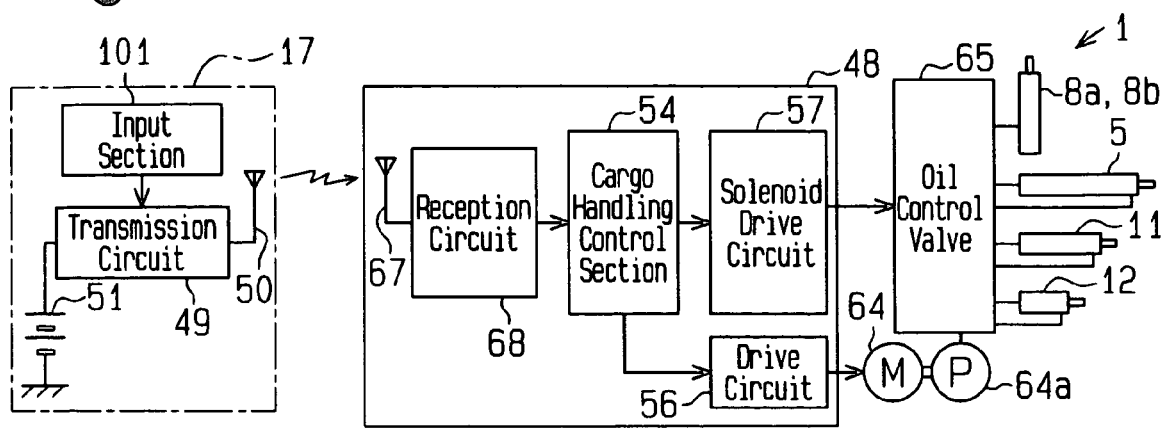
FIG. 18 is a schematic structural diagram of a forklift according to a different example.

The operation section provided on the steering wheel knob 17 is not limited to the load pickup mode switch 46 and the load deposition mode switch 47 which manually change the operation mode of the lock-on system 66. For example, it may be an input section 101 for performing the cargo carrying operation of the forks 6, as shown in FIG. 18. In this case, the input section 101 is one of a lift button, an input section for reaching, an input section for tilting and an input section for side shifting, and a potentiometer type or dial type is employed as its type. When the input section 101 is operated, an operation signal according to the amount of the operation is output to the controller 48 by radio wave, and the cargo handling control section 54 drives the cylinders 5, 8, 11 and 12 by the amounts according to the amount of the operation of the input section 101 to execute various kinds of cargo carrying operations. Therefore, the steering operation and the cargo carrying operation can be executed with one hand at the same time.

Figure 19:
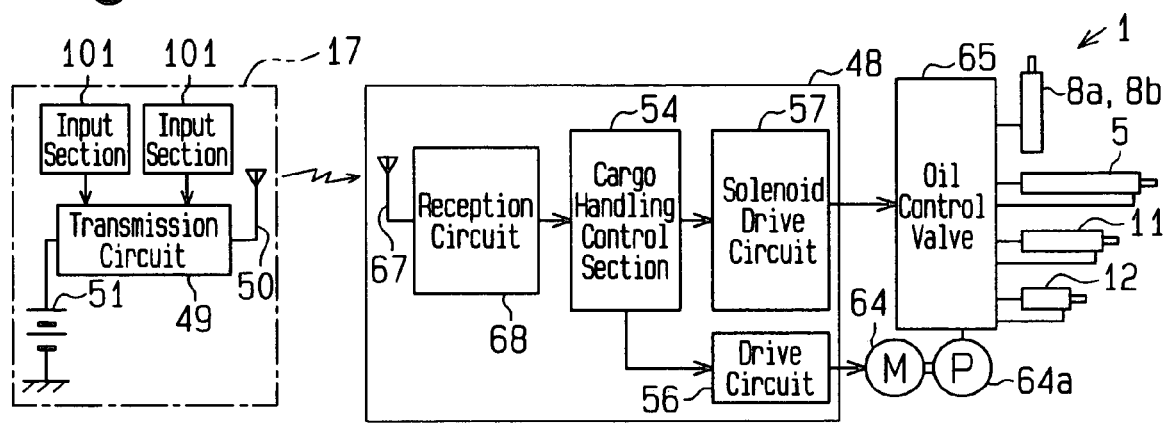
FIG. 19 is a schematic structural diagram of a forklift according to another example.

In case where the steering wheel knob 17 is provided with the input section 101 for a cargo carrying operation, the number of the input section 101 is not limited to one. That is, as shown in FIG. 19, the steering wheel knob 17 may be provided with a plurality of input sections 101 (two in FIG. 19), and the combination may be any combination of an input section for lifting, an input section for reaching, an input section for tilting and an input section for side shifting. In this case, the steering operation and the cargo carrying operation can be executed with one hand at the same time.

Figure 20:
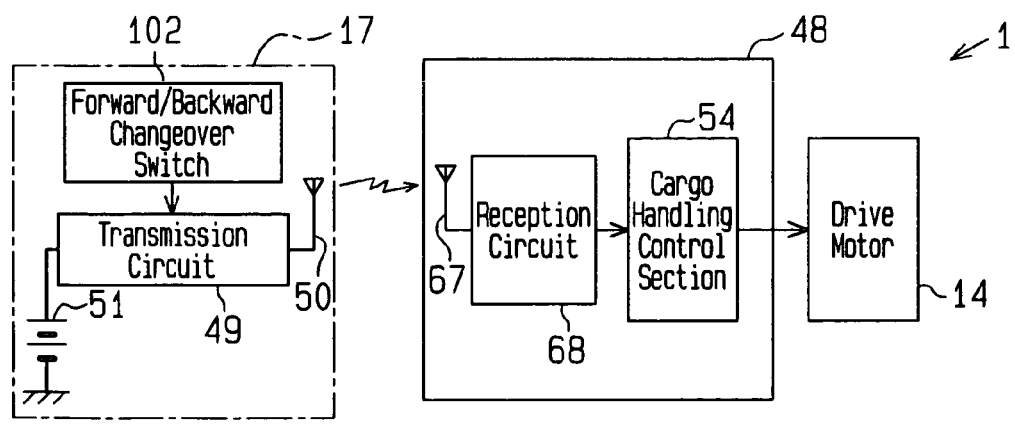
FIG. 20 is a schematic structural diagram of a forklift according to a further example.

The operation section of the steering wheel knob 17 may be a forward/backward changeover switch 102 which switches the running direction of the vehicle between forward and backward as shown in FIG. 20. When the forward/backward changeover switch 102 is depressed, its switch signal is sent out from the antenna 50 on the side of the steering wheel knob 17 by radio wave and that signal is received by the reception circuit 68 of the controller 48. Then, the cargo handling control section 54 may switch forward and backward movements in place of the rotational direction of the drive motor 14 based on the switch signal input by radio wave. In this case, the steering operation and the forward/backward changeover operation can be executed simultaneously.

Figure 21:
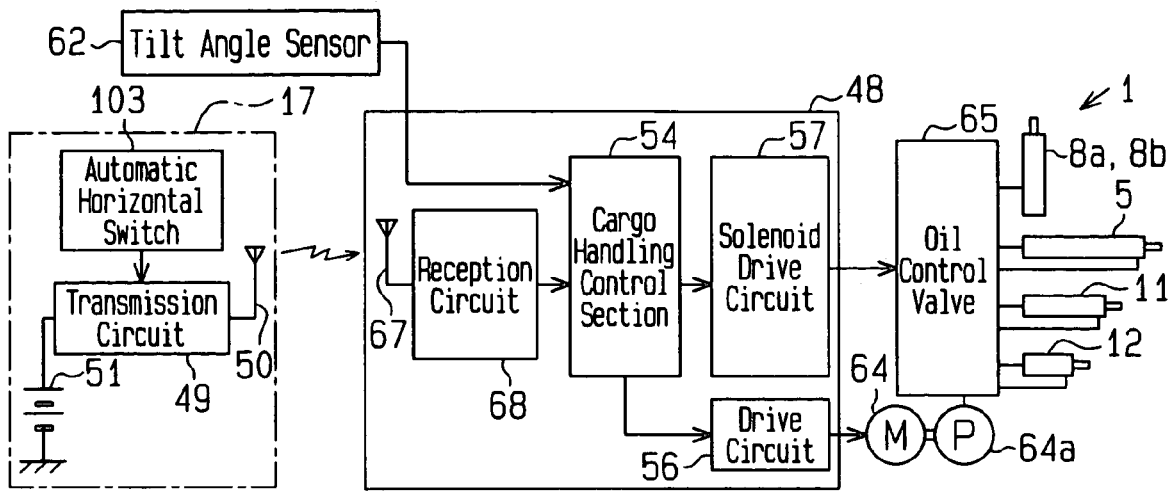
FIG. 21 is a schematic structural diagram of a forklift according to a still further example.

The operation section of the steering wheel knob 17 may be an automatic horizontal switch 103 which automatically sets the forks 6 in a horizontal state as shown in FIG. 21. That is, when the automatic horizontal switch 103 is depressed, its switch signal is sent out from the antenna 50 by radio wave and that radio wave is received by the reception circuit 68 through radio communication. Then, the cargo handling control section 54 may drive the tilt cylinder 12 based on the detected value from the tilt angle sensor 62 so that automatic positioning control is carried out to set the forks 6 in a horizontal state. In this case, the steering operation and the automatic fork horizontal operation can be executed simultaneously.

Figure 22:
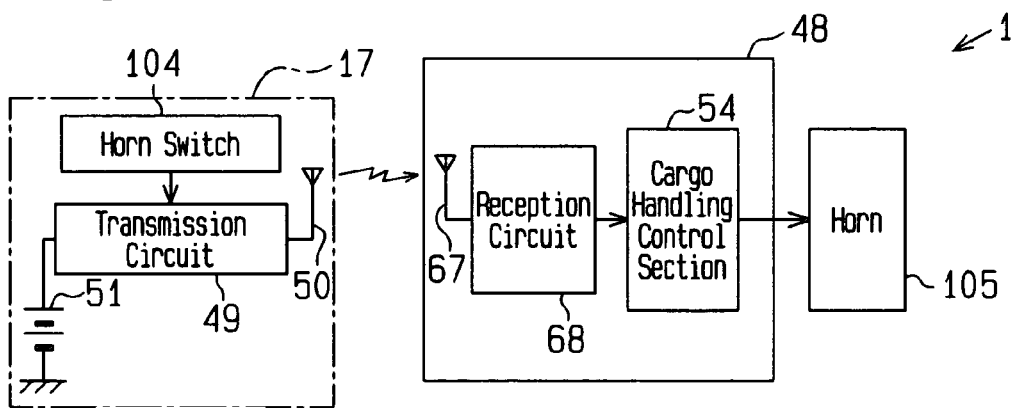
FIG. 22 is a schematic structural diagram of a forklift according to a yet still further example.

The operation section of the steering wheel knob 17 may be a horn switch 104 as shown in FIG. 22. To describe it in detail below, a horn 105 which generates an informing sound, such as a horn, is connected to the output side of the cargo handling control section 54. When the horn switch 104 is depressed, the controller 48 may receive its switch signal by radio wave and the cargo handling control section 54 may output an informing sound from the horn 105 based on that radio wave. In this case, the steering operation and the horn switch operation can be executed simultaneously.

Figure 23:
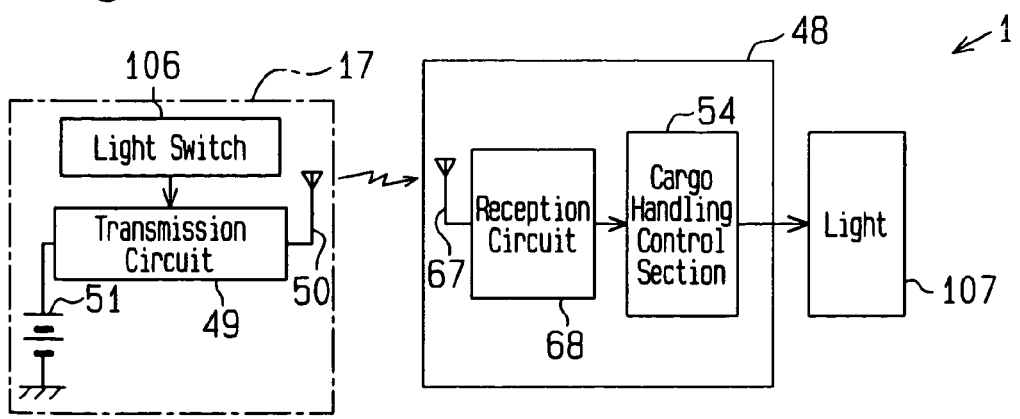
FIG. 23 is a schematic structural diagram of a forklift according to a yet still further example.

The operation section of the steering wheel knob 17 may be a light switch 106 as shown in FIG. 23. To describe it in detail below, a light 107 which illuminates around the vehicle is connected to the output side of the cargo handling control section 54. When the light switch 106 is depressed, the controller 48 may receive its switch signal by radio wave and the cargo handling control section 54 may turn on the light 107 based on that radio wave. In this case, the steering operation and the light switch operation can be executed simultaneously.

Figure 24:
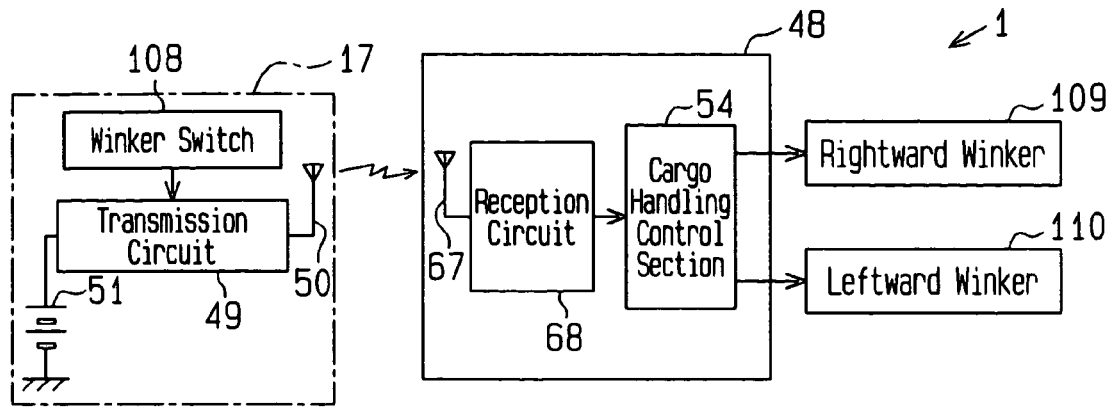
FIG. 24 is a schematic structural diagram of a forklift according to a yet still further example.

The operation section of the steering wheel knob 17 may be a winker switch 108 as shown in FIG. 24. To describe it in detail below, a rightward winker 109 and a leftward winker 110 are connected to the output side of the cargo handling control section 54. The winker switch 108 is a switch which can be depressed left and right with the neutral position as a reference. When the winker switch 108 is depressed rightward, a switch signal according to that operation may be output to the controller 4 from the antenna 50 by radio wave and the cargo handling control section 54 may flicker the rightward winker 109 based on that radio wave.

The leftward winker 110 flickers in similar procedures. In this case, the steering operation and the winker operation can be executed simultaneously.

Figure 25:
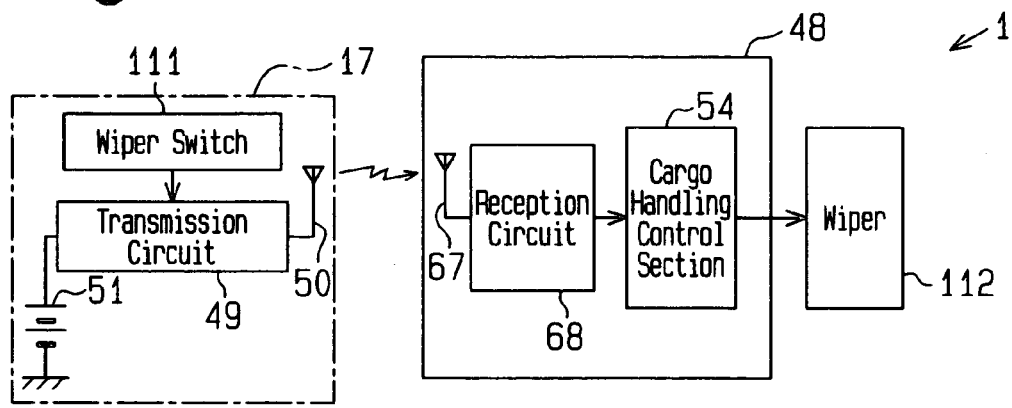
FIG. 25 is a schematic structural diagram of a forklift according to a yet still further example.

The operation section of the steering wheel knob 17 may be a wiper switch 111 as shown in FIG. 25. To describe it in detail below, a wiper 112 is connected to the output side of the cargo handling control section 54. When the wiper switch 111 is depressed, the controller 48 may receive its switch signal by radio wave and the cargo handling control section 54 may activate the wiper 112 based on that radio wave.

Figure 26:
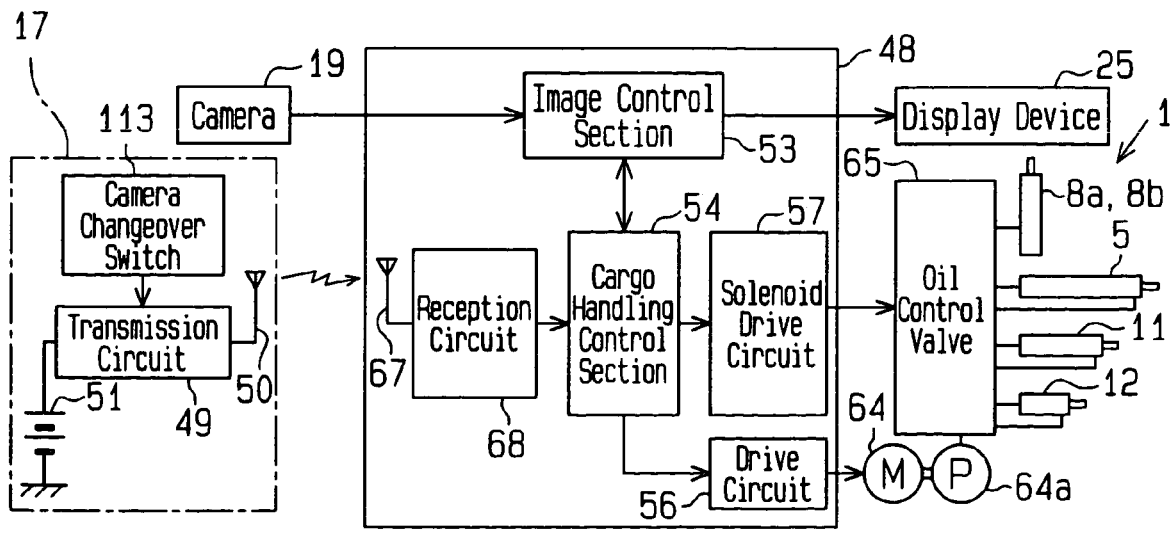
FIG. 26 is a schematic structural diagram of a forklift according to a yet still further example.

The operation section of the steering wheel knob 17 may be a camera changeover switch 113 which changes the video image of the camera 19 as shown in FIG. 26. That is, when the camera changeover switch 113 is depressed, the reception circuit 68 of the controller 48 may receive its switch signal by radio wave and the image control section 53 may change the zooming of a video image on the display device 25 based on that radio wave.

Figure 27:
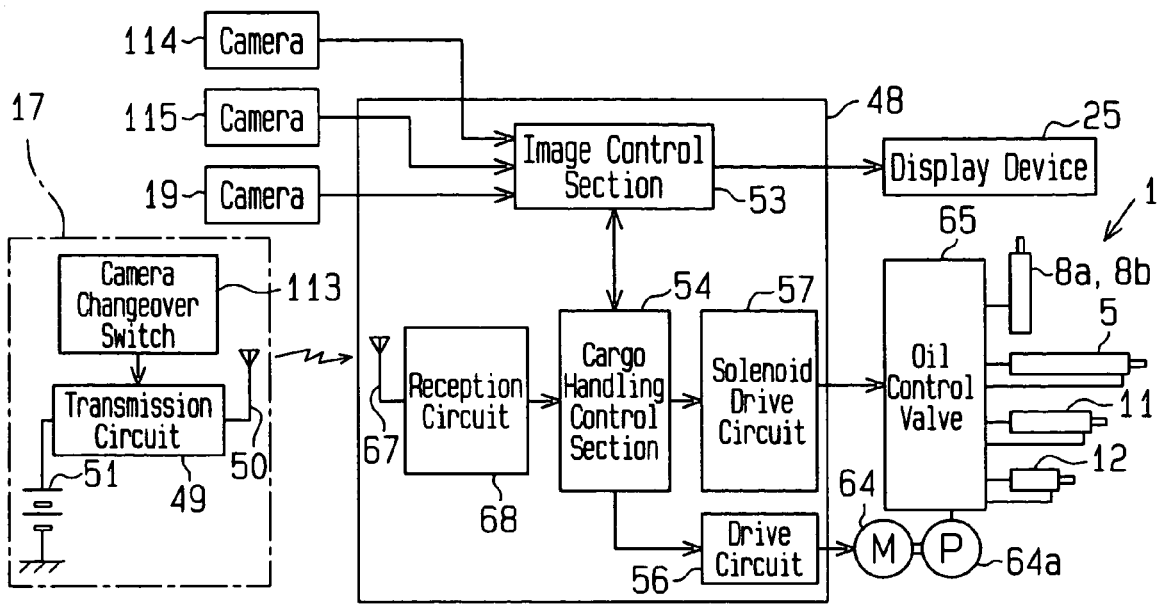
FIG. 27 is a schematic structural diagram of a forklift according to a yet still further example.

In case where the camera changeover switch 113 is provided as the operation section of the steering wheel knob 17, the switch 113 is not limited to the one which changes the zooming of a video image picked up by the camera 19. For example, a plurality of CCD cameras 19, 114 and 115 may be set on the vehicle body 2 and a video image on the display device 25 may be switched between a plurality of cameras by the camera changeover switch 113 as shown in FIG. 27. It is preferable that the mounting positions of those cameras 19, 114 and 115 be a position where the rear of the vehicle can be picked up in addition to a position where the front of the vehicle can be picked up.

Figure 28:
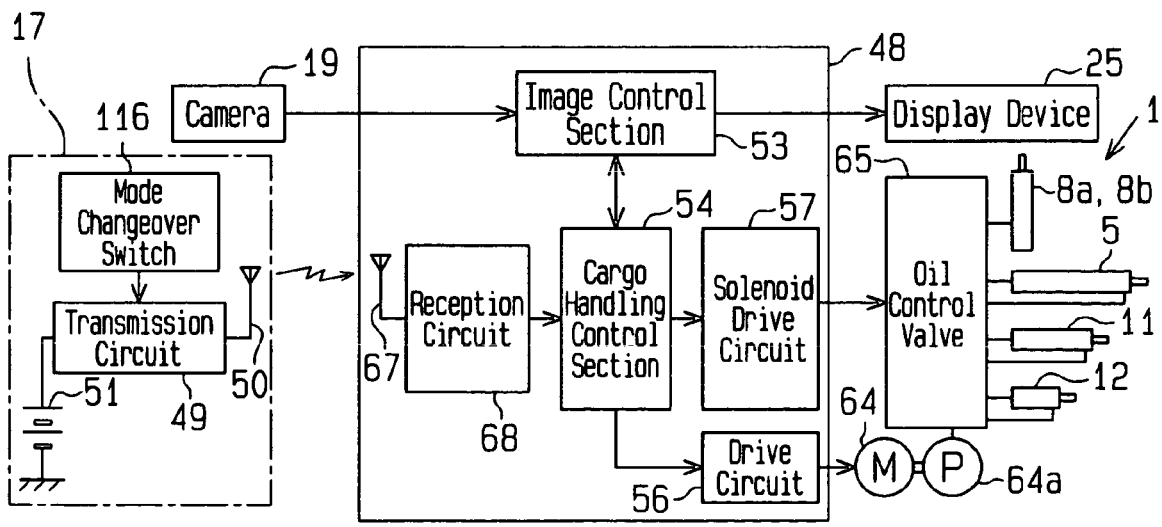
FIG. 28 is a schematic structural diagram of a forklift according to a yet still further example.

The load pickup mode switch 46 and the load deposition mode switch 47 need not necessarily be provided separately. That is, a single mode changeover switch 116 may be provided as shown in FIG. 28, so that every time the mode changeover switch 116 is depressed, the operation mode is switched between the load pickup mode and the load deposition mode. The steering wheel knob 17 may be provided with all of the activation switch 38, the load pickup mode switch 46 and the load deposition mode switch 47.

The operation section of the steering wheel knob 17 may be the activation switch 38 which starts moving the forks 6 at the time of automatic fork position control. Besides that, it may be a switch which activates the lock-on system 66, an accel switch which runs the vehicle and a brake switch which applies braking to the vehicle.

Figure 29:
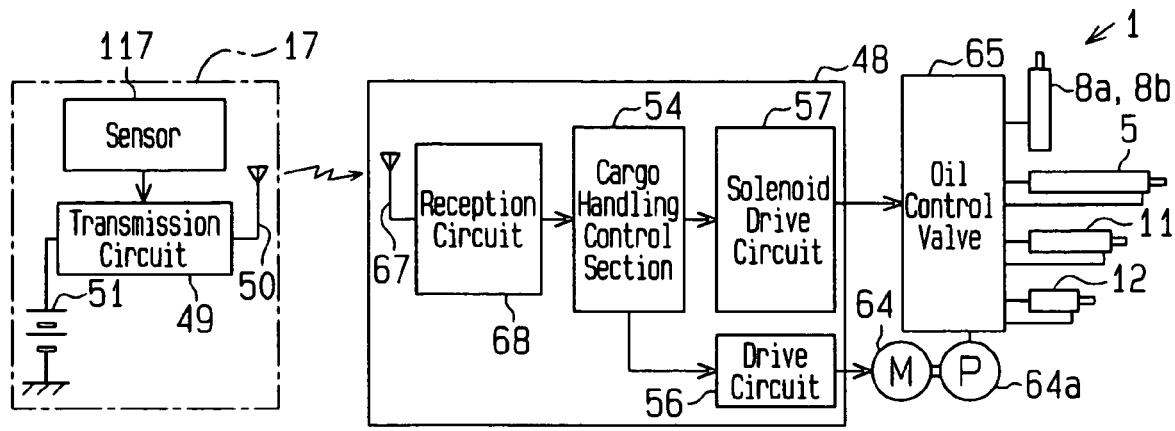
FIG. 29 is a schematic structural diagram of a forklift according to a yet still further example.

The signal that is transmitted from the steering wheel knob 17 is not limited to a signal based on the manipulation of the operation section, such as a switch. For instance, a sensor 117 may be built in the steering wheel knob 17 as shown in FIG. 29 so that a detection signal from the sensor 117 is transmitted from the transmission circuit 49. The sensor 117 may be a sensor which detects gripping of the steering wheel knob. In a non-detection state in which the steering wheel knob is not held, for example, the controller which has received this non-detection signal performs such control as not to start the vehicle even if an accelerating operation is performed.

A contact sensor which makes detection from a change in resistance when a hand touches, a photodetection sensor which detects shielding of light, a pressure sensor which detects gripping pressure, a proximity sensor, etc. are available as the sensor which detects gripping of the steering wheel knob. Even in case of sending a detection signal from a sensor, a trouble of laying wires around and a problem of twisting or stranding of wires can be avoided. In the structure where the steering wheel knob is rotatable relatively to the steering wheel, particularly, it is possible to eliminate the possibility of damage and disconnection of the wires as a result of no guarantee that an operation of setting back the standing of wires is performed and performing an operation only in the direction of rough use of the wires.

Figure 30:
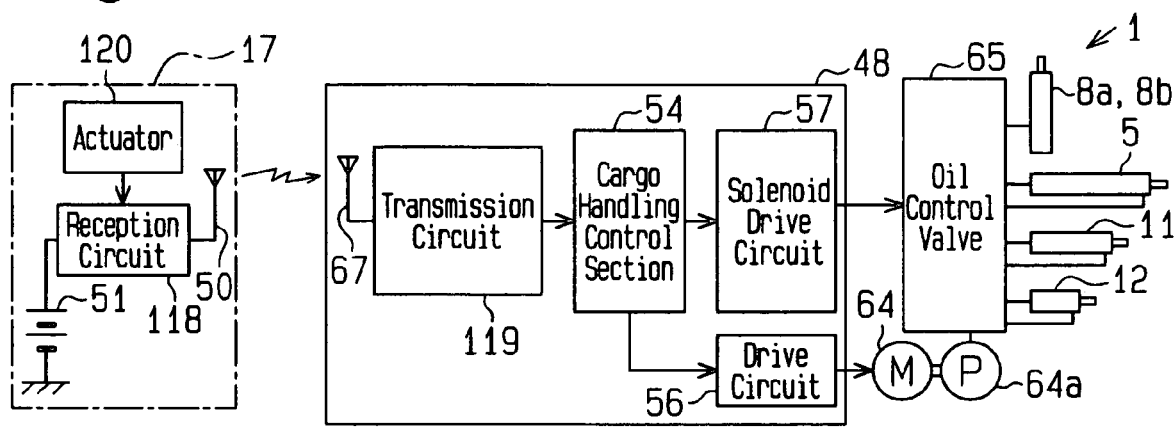
FIG. 30 is a schematic structural diagram of a forklift according to a yet still further example.
Figure 31:
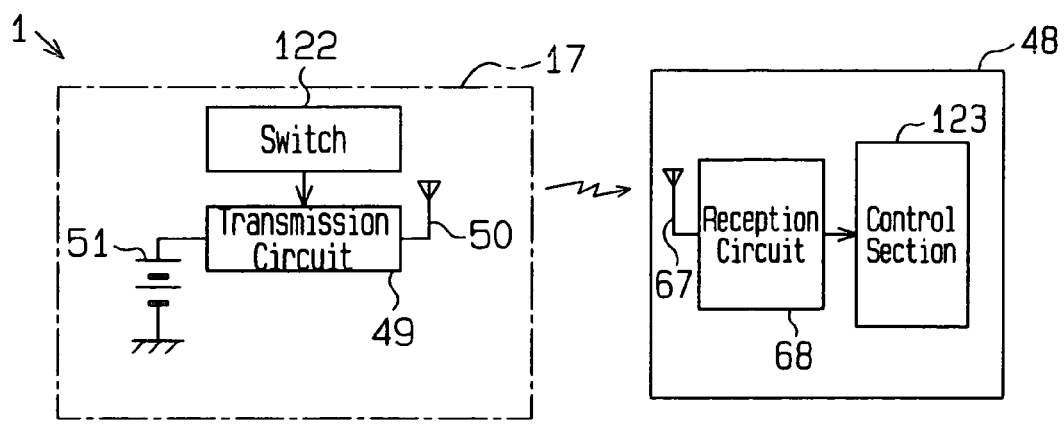
FIG. 31 is a schematic structural diagram of a forklift according to a yet still further example.

The communication section that is incorporated in the steering wheel knob 17 is not limited to the transmission circuit 49 that transmits a signal by radio wave. For instance, a reception circuit 118 may be built in the steering wheel knob 17 as shown in FIG. 30. For example, at the time of notifying the driver of some sort of detected information or instruction, there may be a method of making the notification by vibrating the steering wheel knob 17. In this case, a signal of notification information transmitted from a transmission circuit 119 of the controller 48 is received by the reception circuit 118 of the steering wheel knob 17 and, for example, an actuator (vibration generator) 120 built in the steering wheel knob is activated based on the reception. Notification to inform the driver of an instruction for a cargo carrying work (such as an instruction to shift to a work B during a work A) and notification to inform a recess are available as the notification information.

Further, notification to inform the driver of an abnormality detected by various sensors provided on the vehicle is mentioned as the detected information. For example, there are charge timing notification, fuel supply timing notification, failure notification and so forth. Even in case where a signal from outside is received in this manner, radio reception can avoid the trouble of laying wires around and the problem of twisting or stranding of wires. In the structure where the steering wheel knob is rotatable relatively to the steering wheel, particularly, it is possible to avoid a risk of damage and disconnection of the wires resulting from no guarantee that an operation of setting back the standing of wires is performed and performing an operation only in the direction of rough use of the wires.

The receiver (reception section) of a signal to be output from the transmission circuit 49 of the steering wheel knob 17 is not limited to the vehicle body (equipment platform) 2. For instance, the reception circuit 68 may be a ground-side controller 121. That is, the reception circuit 68 of the ground-side controller 121 receives, via radio wave, a signal which is generated when a switch 122 of the steering wheel knob 17 is operated, and a control section 123 of the ground-side controller 121 performs some kind of control somewhere outside the vehicle.

In case where a cargo carrying work is performed in a freezer, for example, the opening/closing of the door of the freezer is remotely operated by radio by manipulating the switch 122 of the steering wheel knob 17. Further, automatic equipment in an automatic storehouse is informed earlier of a load carry-in work by manipulating the switch of the steering wheel knob 17 to start a carry-in preparation operation. Even when the receiver which receives a transmitted signal from the steering wheel knob is outside the vehicle in this manner, radio transmission can avoid the trouble of laying wires around and the problem of twisting or stranding of wires. In particular, that effect is noticeable in the structure where the steering wheel knob is rotatable relatively to the steering wheel.

Figures 32A, 32B, 32C:
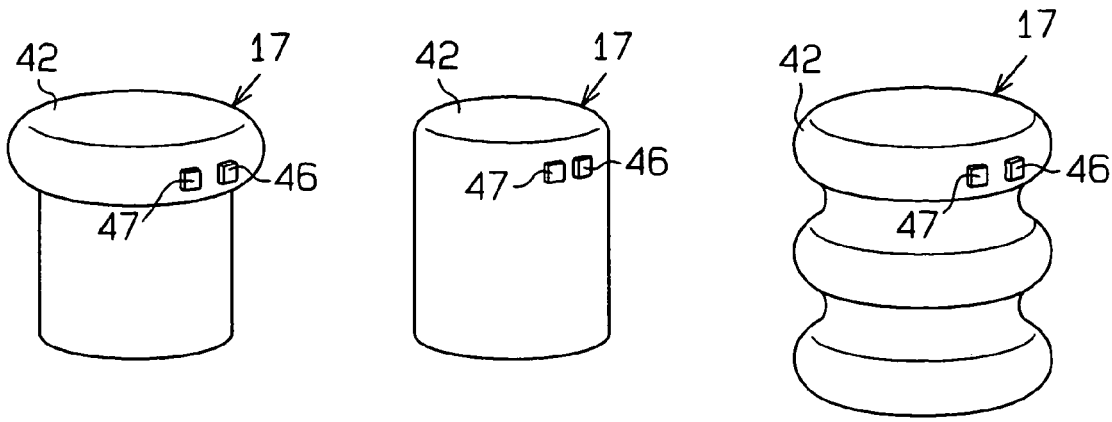
FIG. 32(a) is a perspective view of a steering wheel knob according to a different example.
FIG. 32(b) is a perspective view of a steering wheel knob according to another example.
FIG. 32(c) is a perspective view of a steering wheel knob according to a further example.

The shape of the steering wheel knob 17 is not limited to the one that extends toward the distal end in such a way as to have the holding portion 45. For example, the knob body 42 which has an approximately circularly bulged upper portion as shown in FIG. 32(a) or the knob body 42 which is cylindrical as shown in FIG. 32(b) may be used. Also available is one as shown in FIG. 32(c) whose surface has a plurality of bent shapes according to the grip position in such a way as to ensure easy gripping with a hand.

The layout positions of the load pickup mode switch 46 and the load deposition mode switch 47 are not limited to the flat surface portion 42a on the distal end side of the steering wheel knob 17. For instance, any position on the steering wheel knob 17, such as the top surface of the knob body 42 of the steering wheel knob 17, is feasible. The layout positions of the aforementioned various switches (input section) are not limited as long as they are lie on the steering wheel knob 17.

The steering wheel knob 17 is not limited to be relatively rotatable around the shaft portion 43 to the steering wheel 16. That is, the steering wheel knob 17 may be fixed to the steering wheel 16 so that it is not relatively rotatable to the steering wheel 16.

The total number of operation sections (switches, input sections) provided on the steering wheel knob 17 is not limited to one, but plural operation sections, such as two or three, may be provided depending on the specifications. In case where plural operation sections are provided, their layout positions are not particularly limited.

Figure 33:
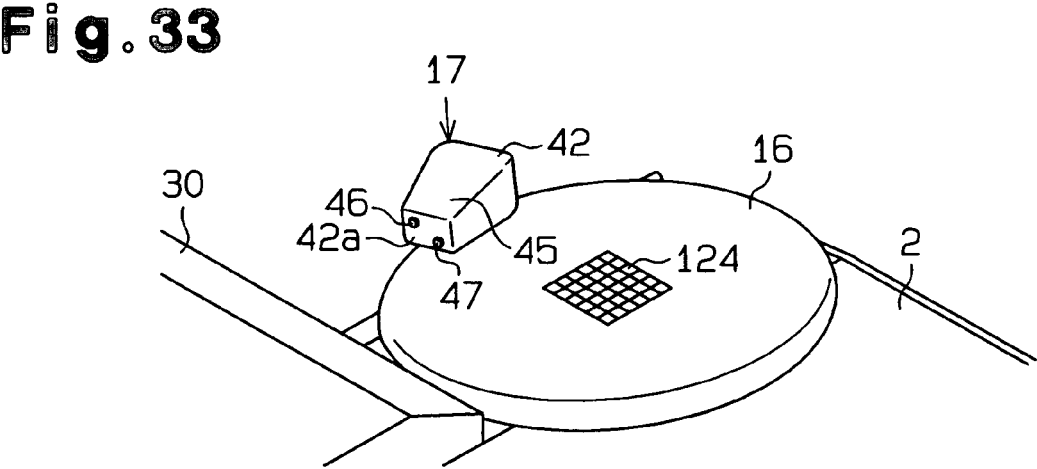
FIG. 33 is a front perspective view of a driver's seat in a still further example.

The power supply for the wireless switch mechanisms of the steering wheel knob 17 is not limited to the replaceable type battery 51. For example, a solar cell 124 may be provided on the top surface of the steering wheel 16 as shown in FIG. 33 so that power is obtained from the solar cell 124. In this case, a battery replacement work need not be performed.

Figure 34:
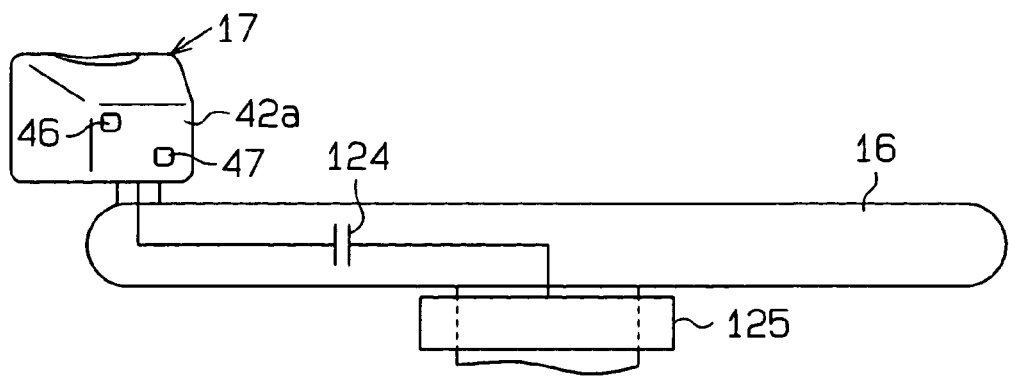
FIG. 34 is a schematic side view of a steering wheel in a still further example.
Figure 35:
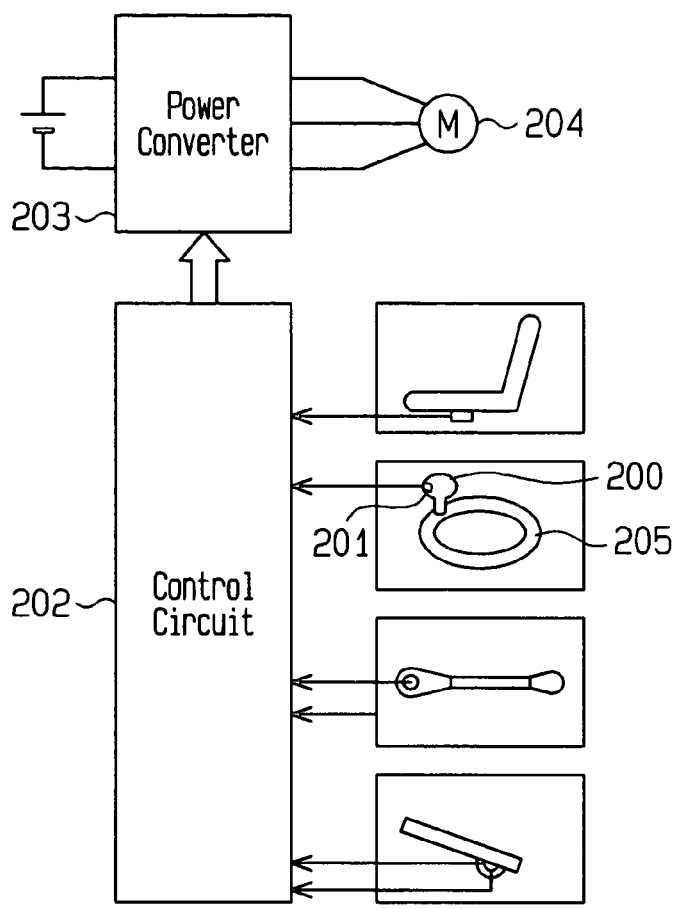
FIG. 35 is a schematic electrical structural diagram of a forklift according to prior art.
Figure 36:
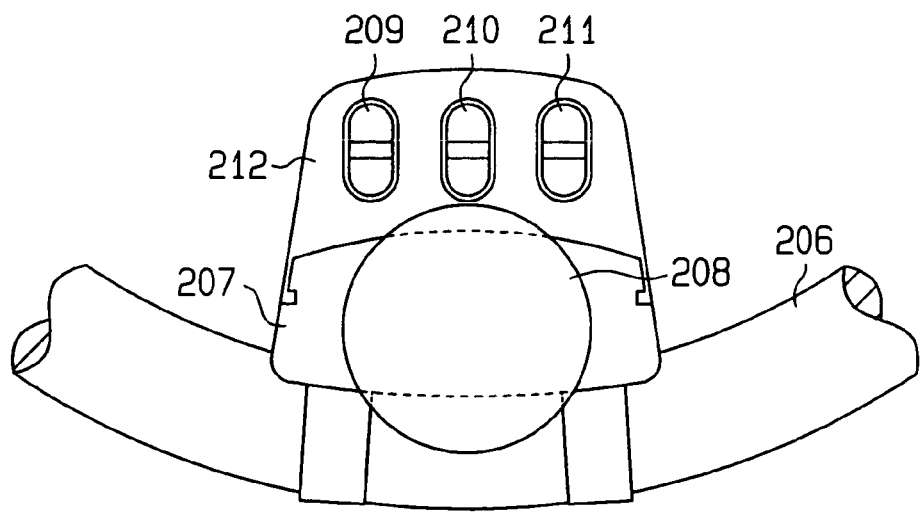
FIG. 36 is a partly enlarged view of a steering wheel according to prior art.

The power supply for the wireless switch mechanisms of the steering wheel knob 17 is not limited to the replaceable type battery 51 or the solar cell 124. For example, a power generating bearing 125 as a power generator may be provided on the steering shaft 40 of the steering wheel 16 as shown in FIG. 34 so that the power from the power generating bearing 125 is stored in a condenser 126 as a capacitor and is used as the power for the wireless switch mechanisms. In this case, a battery replacement work need not be performed either.

The communication system for the wireless switch mechanisms between the steering wheel knob 17 and the controller 48 is not limited to radio communication. For instance, other communication systems, such as infrared communication, may be employed.

The signal that is transmitted by radio wave by the depression of the operation section of the steering wheel knob 17 is not limited to a switch signal. For example, data may be carried on a radio wave to transmit predetermined information to the controller 48. In case where plural industrial vehicles are involved in a cargo carrying work, for example, identification codes may be transmitted so that the ground controller or other vehicles can identify themselves. Further, a method may be employed which selects information from plural pieces prepared in advance in accordance with the types of the switches of the steering wheel knob 17 and the number of switch operations and transmits data of the selected information.

The camera 19 mounted on the forklift 1 is not limited to an elevation type which moves upward and downward, but may be, for example, a fixed type which fixes the camera 19 to the middle beam that links the two inner masts 7c, 7c.

The industrial vehicle is not limited to a reach type forklift but may be a counterbalance type forklift. Further, the attachment is not limited to the forks 6 but other types, such as a clamp and a shovel, may be used as well.

The invention claimed is:

1. A steering wheel knob for an industrial vehicle, which is provided on a steering wheel mounted on a vehicle via a steering shaft, said knob being projected from the steering wheel in a direction parallel to the axis of the steering shaft in order to be gripped by a driver at the time of operating the steering wheel to provide vehicle steering, wherein a wireless communication section capable of executing at least one of transmission and reception by radio communication is built in said knob.

2. The steering wheel knob for an industrial vehicle according to claim 1, wherein said communication section includes a transmission section performing transmission of a signal, wherein the knob has an operation section and when said operation section is operated, said transmission section outputs a radio signal.

3. The steering wheel knob for an industrial vehicle according to claim 2, wherein said knob is rotatable relative to the steering wheel around a shaft portion projecting from a knob body.

4. The steering wheel knob for an industrial vehicle according to claim 1, wherein said communication section includes a transmission section performing transmission of a signal, and wherein the knob has a sensor and when said sensor becomes a detection state, said transmission section outputs a radio signal.

5. The steering wheel knob for an industrial vehicle according to claim 4, wherein said knob is rotatable relative to the steering wheel around a shaft portion projecting from a knob body.

6. The steering wheel knob for an industrial vehicle according to claim 1, wherein said knob has wireless input means which has an operation section to be operated manually and a transmission section for outputting a radio signal when said operation section is operated.

7. A steering wheel knob for an industrial vehicle, according to claim 6, wherein said steering wheel is for steering to steer wheels.

8. The steering wheel knob for an industrial vehicle according to claim 7, wherein said knob is rotatable around a shaft portion which supports said knob relatively to said steering wheel.

9. The steering wheel knob for an industrial vehicle according to claim 8, wherein a knob body of said knob rotatable relatively to said steering wheel has a shape extending toward a tip side with a shaft portion as a starting point in such a way that said knob has a holding portion, and said operation section is arranged at such a portion where a finger of an operator, when holding said knob, is positioned.

10. The steering wheel knob for an industrial vehicle according to claim 8, wherein a knob body of said knob rotatable relatively to said steering wheel has a shape extending toward a tip side with said shaft portion as a starting point in such a way that said knob has a holding portion, and said knob is provided with urging means for urging a direction of said knob in such a way that said holding section is positioned at a suitable position even when said steering wheel is steered to any position.

11. The steering wheel knob for an industrial vehicle according to claim 10, wherein one of said steering wheel and knob switch is set in such a way that its rotational axis is inclined by a predetermined angle to vertical, said urging means is a weight, and the direction of said knob is adjusted by a dead load of that weight.

12. The steering wheel knob for an industrial vehicle according to claim 6, wherein a power supply for the input means is incorporated in said knob.

13. The steering wheel knob for an industrial vehicle according to claim 12, wherein said power supply includes a solar cell.

14. The steering wheel knob for an industrial vehicle according to claim 12, wherein said power supply comprises a generator and a condenser for storing power generated by said generator.

15. The steering wheel knob for an industrial vehicle according to claim 6, wherein said operation section is radio-communicatable with a reception section on an equipment platform side via the transmission section.

16. The steering wheel knob for an industrial vehicle according to claim 6, wherein said operation section is a switch which outputs an ON/OFF signal in accordance with an operation of said operation section and the transmission section outputs a radio signal according to said ON/OFF signal.

17. The steering wheel knob for an industrial vehicle according to claim 6, wherein said operation section is of an output variable type which outputs a signal according to an amount of an operation of said operation section and the transmission section outputs a radio signal according to said output signal.

18. The steering wheel knob for an industrial vehicle according to claim 6, wherein said operation section is for a cargo carrying operation to operate a cargo carrying apparatus.

19. The steering wheel knob for an industrial vehicle according to claim 18, wherein said vehicle has an automatic position control function for automatically positioning said cargo carrying apparatus and said operation section performs automatic position control which is carried out at a time of activating said automatic position control.

20. The steering wheel knob for an industrial vehicle according to claim 19, wherein said operation section is a mode changeover switch for switching an operation mode of said automatic position control function to a mode according to a cargo carrying work.

21. The steering wheel knob for an industrial vehicle according to claim 19, wherein said automatic position control function is an automatic horizontal control function for automatically rendering said cargo carrying apparatus in a horizontal state and the operation section is an automatic horizontal switch for activating said automatic horizontal control function.

22. The steering wheel knob for an industrial vehicle according to claim 6, wherein said operation section is a switch for operating a vehicle apparatus to be operated at a time of running.

23. The steering wheel knob for an industrial vehicle according to claim 22, wherein said switch is a forward/backward changeover switch for switching a running direction of said vehicle between forward and backward directions.

24. The steering wheel knob for an industrial vehicle according to claim 22, wherein said switch has at least one of a horn switch, light switch, winker switch and wiper switch as a constituting element.

25. The steering wheel knob for an industrial vehicle according to claim 22, wherein said switch is a light switch for turning on a light.

26. The steering wheel knob for an industrial vehicle according to claim 22, wherein said switch is a winker switch for blinking a winker.

27. The steering wheel knob for an industrial vehicle according to claim 22, wherein said switch is a wiper switch for operating a wiper.

28. The steering wheel knob for an industrial vehicle according to claim 6, wherein said vehicle has image pickup means capable of picking up an image around said vehicle and display means for displaying an image from said image pickup means and said operation section is an image changeover switch for changing image contents on said display means.

29. The steering wheel knob for an industrial vehicle according to claim 6, wherein said vehicle has a plurality of image pickup means capable of picking up an image around said vehicle and display means for displaying an image from said image pickup means and said operation section is an image changeover switch for changing image contents on said display means among said plurality of image pickup means.

30. A steering wheel knob for an industrial vehicle, which is provided on a steering wheel mounted on a vehicle via a steering shaft, said knob being projected from the steering wheel in a direction parallel to the axis of the steering shaft in order to be gripped by a driver at the time of operating the steering wheel to provide vehicle steering, wherein a wireless communication section capable of executing at least one of transmission and reception by radio communication is built in said knob and a communication target of said communication section is sited on a ground side.

31. The steering wheel knob for an industrial vehicle according to claim 30, wherein said communication section is a transmission section which performs transmission of a signal, said knob is provided with an operation section and when said operation section is operated, said transmission section outputs a radio signal to the communication target on the ground side.

32. The steering wheel knob for an industrial vehicle according to claim 30, wherein said communication section is a transmission section which performs signal transmission, said knob is provided with a sensor and when said sensor becomes a detection state, said transmission section outputs a radio signal to the communication target on the ground side.

* * * * *